(12) United States Patent
Hwang et al.

(10) Patent No.: US 9,906,823 B2
(45) Date of Patent: Feb. 27, 2018

(54) METHOD AND APPARATUS FOR TRANSMITTING AND RECEIVING MULTI-MEDIA SERVICES

(71) Applicants: Samsung Electronics Co., Ltd., Suwon-si, Gyeonggi-do (KR); University of Seoul Industry Cooperation Foundation, Seoul (KR)

(72) Inventors: Sung-Oh Hwang, Yongin-si (KR); Yong-Han Kim, Seongnam-si (KR); Kyung-Mo Park, Seoul (KR); Sung-Ryeul Rhyu, Yongin-si (KR); Jae-Yeon Song, Seoul (KR)

(73) Assignees: Samsung Electronics Co., Ltd., Suwon-si (KR); University of Seoul Industry Cooperation Foundation, Seoul (KR)

( * ) Notice: Subject to any disclaimer, the term of this patent is extended or adjusted under 35 U.S.C. 154(b) by 11 days.

(21) Appl. No.: 15/281,773

(22) Filed: Sep. 30, 2016

(65) Prior Publication Data

US 2017/0019690 A1    Jan. 19, 2017

Related U.S. Application Data

(63) Continuation of application No. 14/398,645, filed as application No. PCT/KR2013/003808 on May 2, 2013, now Pat. No. 9,462,311.
(Continued)

(30) Foreign Application Priority Data

Apr. 17, 2013 (KR) .................. 10-2013-0042576

(51) Int. Cl.
*H04N 21/2362* (2011.01)
*H04H 60/73* (2008.01)
(Continued)

(52) U.S. Cl.
CPC ........ *H04N 21/2362* (2013.01); *H04H 60/73* (2013.01); *H04N 21/235* (2013.01);
(Continued)

(58) Field of Classification Search
CPC combination set(s) only.
See application file for complete search history.

(56) References Cited

U.S. PATENT DOCUMENTS 8,638,818 B2    1/2014  Hwang et al.
2001/0055319 A1*  12/2001  Quigley .................. H04L 1/203
                                                                     370/480
(Continued)

FOREIGN PATENT DOCUMENTS

JP    2010-041492 A    2/2010
KR    10-2011-0117033 A    10/2011
(Continued)

OTHER PUBLICATIONS

"Information technology—Generic coding of moving pictures and associated audio information: Systems", H.222.0 (02/00), Sep. 29, 2000.
(Continued)

*Primary Examiner* — Kieu Oanh T Bui
(74) *Attorney, Agent, or Firm* — Jefferson IP Law, LLP

(57) ABSTRACT

A server for transmitting and receiving messages for a Signaling (S) layer in a Moving Picture Experts Group (MPEG) Media Transport (MMT) is provided. The server includes a first sub-layer of the S layer for producing first messages to provide information used for the use of MPEG a second sub-layer of the S layer for producing second messages to provide information used for delivering MPEG media, and a Delivery (D) layer for making external and internal deliveries of the first and the second messages, wherein each of the first and the second messages includes
(Continued)

at least one field corresponding to each of the message type, version, length, extension field and payload.

15 Claims, 8 Drawing Sheets

Related U.S. Application Data

(60) Provisional application No. 61/671,923, filed on Jul. 16, 2012, provisional application No. 61/641,410, filed on May 2, 2012.

(51) Int. Cl.
    *H04N 21/434*     (2011.01)
    *H04N 21/462*     (2011.01)
    *H04N 21/61*     (2011.01)
    *H04N 21/235*     (2011.01)
    *H04H 60/13*     (2008.01)

(52) U.S. Cl.
    CPC ....... *H04N 21/4345* (2013.01); *H04N 21/462* (2013.01); *H04N 21/6125* (2013.01); *H04H 60/13* (2013.01)

(56) References Cited

U.S. PATENT DOCUMENTS

| | | |
|---|---|---|
| 2009/0154499 A1 | 6/2009 | Yamakage et al. |
| 2010/0037282 A1 | 2/2010 | Iwata et al. |
| 2011/0208829 A1 | 8/2011 | Kwon et al. |
| 2012/0089634 A1 | 4/2012 | Choi et al. |

FOREIGN PATENT DOCUMENTS

| | | |
|---|---|---|
| KR | 10-2011-0122812 A | 11/2011 |
| KR | 10-2012-0031033 A | 3/2012 |
| KR | 10-2012-0036761 A | 4/2012 |
| WO | 2008-102732 A | 8/2008 |

OTHER PUBLICATIONS

Youngkwon Lim, "Review of w11792[online], JCTVC-EJCTVC-E360-v3", Mar. 20, 2011.
"Proposal for MMT EE#12 ,C.1 Layer Design EE", XP030050100, ISO/IEC JTC1/SC29/WG11, Oct. 23, 2011.
"Technology under Considerations on MPEG Media Transport", XP030018665, ISO/IEC JTC1/SC29/WG11, Aug. 24, 2011.

\* cited by examiner

METHOD AND APPARATUS FOR TRANSMITTING AND RECEIVING MULTI-MEDIA SERVICES

CROSS-REFERENCE TO RELATED APPLICATION(S)

This application is a continuation application of prior application Ser. No. 14/398,645, filed on Feb. 4, 2015, which issues as U.S. Pat. No. 9,462,311 on Oct. 4, 2016, which is a National Stage application under 35 U.S.C. § 371 of an International application filed on May 2, 2013 and assigned application number PCT/2013/003808, which claimed the benefit of a Korean patent application filed on Apr. 17, 2013 in the Korean Intellectual Property Office and assigned Serial number 10-2013-0042576, the benefit under 35 U.S.C. § 119(e) of a U.S. Provisional application filed on Jul. 16, 2012 in the U.S. Patent and Trademark Office and assigned Ser. No. 61/671,923, and the benefit under 35 U.S.C. § 119(e) of a U.S. Provisional application filed on May 2, 2012 in the U.S. Patent and Trademark Office and assigned Ser. No. 61/641,410, the disclosures of which are incorporated herein by reference in their entirety.

TECHNICAL FIELD

The present disclosure relates to a method of providing a multimedia service. More particularly, the present disclosure relates to a method in which a service provider who provides a broadcast and communication-converged service in a heterogeneous network environment transmits detailed information on the service provided by the service provider.

BACKGROUND

As the Internet has evolved to provide increasing amounts and diverse types of data, Internet broadcasting which provides multimedia using the general Internet according to scheduling has become possible as well as related-art broadcasting using a terrestrial, satellite, or cable-dedicated channel. Further, a broadcast and communication-converged multimedia service in which related-art broadcasting and Internet broadcasting are more organically combined to provide various services has arisen as a realistic service.

Broadcasting service providers (e.g., broadcasting companies) may transmit contents through not only a dedicated channel but also the Internet, and even a broadcasting service provider who transmits contents through only the Internet without a dedicated broadcasting channel has appeared. Accordingly, regardless of whether it is a broadcasting company using both the dedicated channel and the Internet or a broadcasting company using only the Internet, it is required to promote its own program contents to viewers and to allow the viewers to plan to view the program contents by delivering the program contents together with its own program scheduling information to viewers. Even by providing a "replay service" through the Internet, the broadcasting company allows the viewers to view contents later which the viewers did not view during the original airing. In related-art broadcasting, such a type of information is referred to as an Electronic Program Guide (EPG), and is referred to as a Program and System Information Protocol (PSIP) in a North American type and Service Information (SI) in a European type on the basis of the Digital Video Broadcasting (DVB) system standard. Further, it is referred to as Program Specific Information (PSI) in the Moving Picture Experts Group (MPEG)-2 system standard widely used in a related-art digital TeleVision (TV) scheme. Although both the PSI and the PSIP are transmitted together in the North American type, a viewer may select a program only by the PSIP. In the European type, both the PSI and the SI are transmitted together and a program may be selected only by the PSI, but various pieces of guide information for the program are additionally provided through the SI. In the present specification, such types of pieces of information are collectively referred to as Service Specific Information (SSI).

Unlike the related-art broadcasting using the dedicated channel, the Internet broadcasting is globally provided. Accordingly, the Internet broadcasting can be accessed through the Internet anywhere in the world that a receiver which can receive the Internet broadcasting exists, beyond a regional property of the related-art broadcasting. Therefore, only when the Internet broadcasting is provided in a unique single type in the world to overcome the regional property of the related-art broadcasting standard which is largely classified into North America, Europe, and Japan, an unnecessary increase in complexity of the receiver can be prevented. From this viewpoint, the SSI also requires the standard in a single type.

A new broadcast and communication-converged broadcasting system is expected to be based on the Internet. That is, a receiver will read not only program contents through the related-art broadcasting channel but also program contents through the Internet, insert the read program contents into the SSI in a machine-readable form, and then transmit the SSI, so that the SSI will be acquired through the broadcasting channel or the Internet, used for controlling broadcast reception, and shown in a viewer-readable form as needed. Of course, an Internet broadcasting company which does not use a dedicated broadcasting channel will transmit SSI through the Internet.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of present disclosure provides a form in which a service provider who provides a broadcasting and communication-converged service in a heterogeneous network environment transmits detailed information on the service provided by the service provider.

The present disclosure suggests a message format of a signaling layer in a Moving Picture Experts Group (MPEG) Media Transport (MMT).

The present disclosure provides a method and an apparatus for transmitting a message of a signal layer in an MMT.

In accordance with an aspect of the present disclosure, a server transmitting and receiving a message for a Signaling (S) layer in an MMT is provided. The server includes a first sub-layer of the S layer configured to generate first messages to provide information to be used for the use of MPEG a second sub-layer of the S layer configured to generate second messages to provide information to be used for delivering MPEG media, and a Delivery (D) layer configured to perform external delivery and internal delivery for the first messages and the second messages, wherein each of the first messages and the second messages includes at least one field corresponding to each of a message type, a version, a length, an extension field, and a payload. A field of the version indicates whether a corresponding message is new, a field of the length indicates a length of a corresponding message, a field of the extension has different pieces of information according to respective messages, and the payload includes information on the S layer which a corresponding message desires to actually transmit. A field of the message type indicates which type of S layer information exists in a field of the payload. The S layer information includes at least one of full Composition Information (CI), CI for a package, CI for an asset, CI for MPEG media presentation, CI for security, and values reserved for the future use of a message of the first sub-layer as values of the first messages. The S layer information includes at least one of an encryption (E) layer entity structure, a delivery (D) 1 payload structure, a D2 packet structure, Application Layer-Forward Error Correction (AL-FEC), measurement composition, D3 information delivery, and values reserved for the future use of a message of the second sub-layer as values of the second messages.

In accordance with an aspect of the present disclosure, a method of transmitting and receiving a message for an S layer in an MMT is provided. The method includes generating first messages to provide information to be used for the use of MPEG through a first sub-layer of the S layer, generating second messages to provide information to be used for delivering MPEG media through a second sub-layer of the S layer, and performing external delivery and internal delivery for the first messages and the second messages through a D layer, wherein each of the first messages and the second messages includes at least one field corresponding to each of a message type, a version, a length, an extension field, and a payload.

According to the present disclosure, a service provider applies a format for providing service detail information suggested by the present disclosure to provide detailed information on a service provided by the service provider, so that a receiver allows a viewer to easily select broadcasting contents which the viewer desires to view, by using the service detail information.

According to the present disclosure, a message format of a signaling layer and a D-message of the signaling layer can be transmitted and received.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
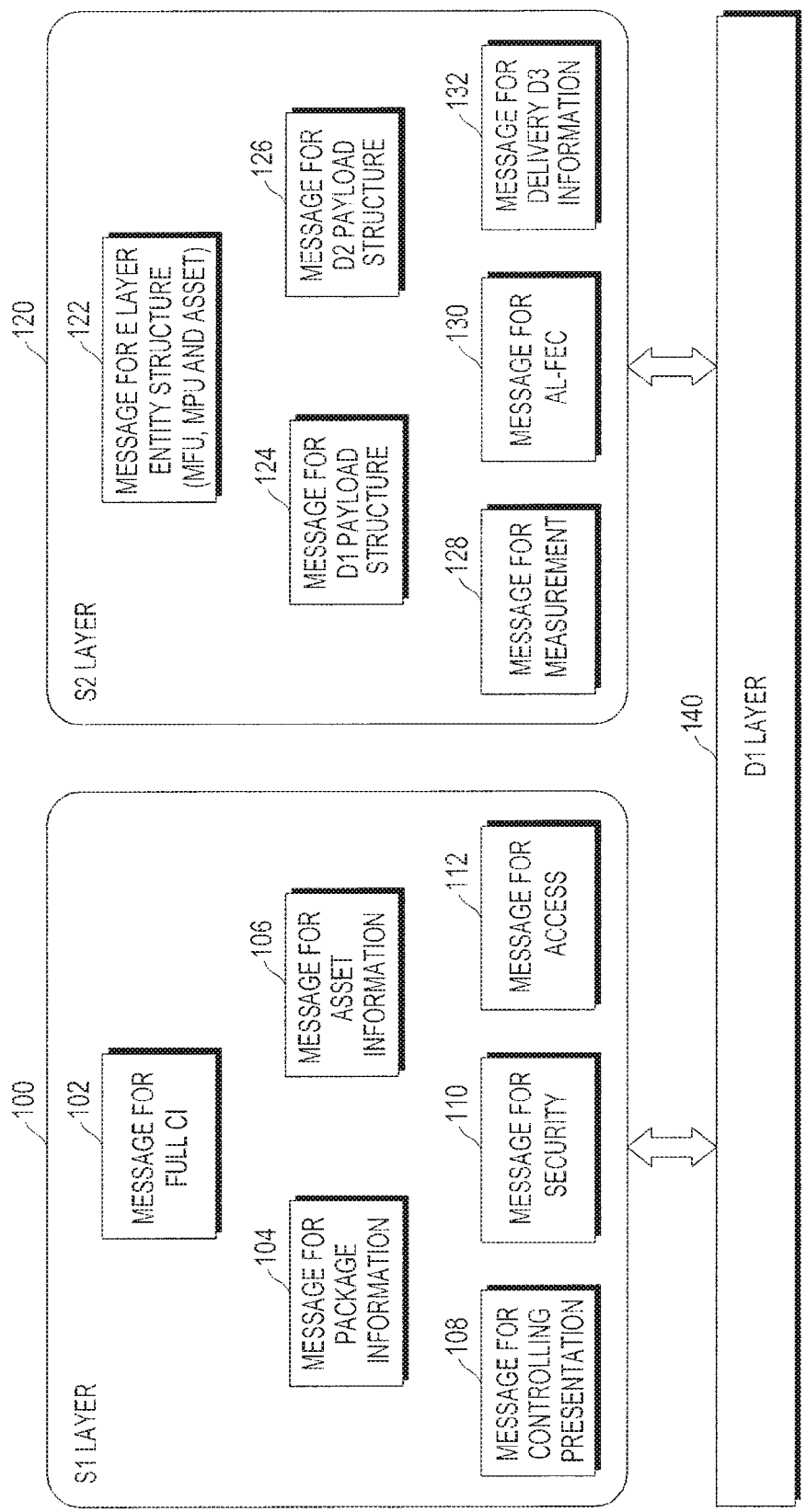
FIG. 1 illustrates a structure of a Signaling (S) layer in a Moving Picture Experts Group (MPEG) Media Transport (MMT) according to a second embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First Embodiment

The first embodiment of the present disclosure suggests a hierarchical structure for Moving Picture Experts Group (MPEG) Media Transport (MMT) Composition Information (CI) (MMT CI).

The MMC CI includes various pieces of information of different importance. For example, information on main assets such as video and audio data is most important. In contrast, information on auxiliary assets is less important in comparison with the main assets. Least important information may be program information such as textual description for contents containing information on a program director, actors/actresses, or manufacturing date.

In one broadcasting scenario, a part of the MMT CI used for providing a presentation at a minimum level should be periodically transmitted to receivers in a small interval (for example, 500 ms). As the interval is shorter, a delay which a viewer experiences during acquisition of the program becomes shorter. However, a shorter interval means a lower transmission efficiency. The transmission efficiency is very important to applications such as a broadcast of which a bandwidth is extremely limited and a mechanism to transmit the less important MMT CI in a relatively long interval should be provided.

In a one-to-one communication scenario, just after a session setup, that is, before transmission of asset resources, all MMT CI is transmitted. In this case, partial transmission of the MMT CI may not be needed.

Layer 0 of the MMT CI includes mandatory information used for expressing a first scene and the following scenes. In addition to the requirements, a method of dividing full CI to layers of the MMT CI is determined by a user, that is, a broadcaster. In one broadcasting scenario, layer 0 of the MMT CI is transmitted in a shortest interval among all layers. Within discretion of a transmitter, some of the MMT CI which are not mandatory may be included in layer 0 of the MMT CI. Layer N (N=1, 2, 3, . . . maxLayer) of the MMT CI transmits a less important part of the MMT CI which does not contain predetermined mandatory information for expressing the first scene. A larger layer number means a longer transmission interval.

When "numLayer" is "1", layer 0 of the MMT CI corresponds to "complete" type composition information.

In order to inform the receivers that a particular layer of the MMT CI is updated, a new attribute called "version" is defined according to each layer syntax. When a version of the received part of the MMT CI is larger than a version which has been previously received, analyzed, and stored in a storage unit of the receiver, the part is analyzed and a result thereof is used for updating the MMT CI already stored in the receiver. Versioning is part-independent, and the receiver stores the most recent version per part. However, all MMT CI stored in one receiver is a result of accumulation and combination of a series of additions and updates of parts of the MMT CI.

One receiver will first receive and analyze layer 0 of the MMT CI (before predetermined other parts of "update" type MMT CI and predetermined MMT CI). When layer 0 of the MMT CI is analyzed and stored in one receiver, other layers except for layer 0 of the MMT CI may be sequentially processed based on reception orders thereof regardless of the layer number. When layer 0 of the MMT CI is completely analyzed and processed, one receiver doesn't wait for other layers of the MMT CI except for layer 0 before processing media assets and providing results thereof.

Examples of the "update" type MMT CI may include deleting or replacing commands for components included in different layers of the MMT CI. In the beginning of the program acquisition, there may be a case where components which have not yet received some MMT CI "update" commands are referred to. In this case, the MMT CI "update" commands are analyzed and executed, but there is no dependent component in the commands, so it has no effect.

CompositionInformationType syntax suggested by the first embodiment of the present disclosure is as follows.

TABLE 1

```
<!-- ############################################### -->
<element name="CI" type="CompositionInformationType"/>
<complexType name="CompositionInformationType">
    <sequence>
        <element name="PI" type="PIType" minOccur="0"/>
```

TABLE 1-continued

```
        <element name="LoA" type="LoAType" minOccur="0"/>
        <element name="STIA" type="STIAType" minOccur="0"/>
        <element name="Insert" type="InsertType" minOccur="0"
            maxOccurs="unbounded"/>
        <element name="Delete" type="DeleteType" minOccur="0"
            maxOccurs="unbounded"/>
        <element name="Replace" type="ReplaceType" minOccur="0"
            maxOccurs="unbounded"/>
    </sequence>
    <attribute name="id" type="ID" use="optional"/>
    <attribute name="type" use="required">
        <simpleType>
            <restriction base="string">
                <enumeration value="Complete"/>
                <enumeration value="Layered"/>
                <enumeration value="Update"/>
            </restriction>
        </simpleType>
    </attribute>
    <attribute name="layer" type="nonNegativeInteger" use="optional">
    <attribute name="version" type="unsignedByte" use="optional">
    <attribute name="numLayer" type="positiveInteger" use="optional">
</complexType>
```

In Table 1 above, meanings of new or modified attributes will be described below.

Type—This attribute indicates the use of the CI for initialization or update. When the type corresponds to "Layered", the MMT CI is divided into a plurality of layers.

Layer—This attribute indicates a layer number of the MMT CI. When the type corresponds to "Layered", this attribute is mandatory. A smallest layer number is "0".

Version—This attribute indicates a version of the MMT CI. This attribute is optional, but mandatory for applications of which MMT CI is periodic. The version increases per update. When the version reaches maxVersionValue, the version is limited to "0".

numLayer—This attribute indicates the number of layers of the layered MMT CI. This attribute is optional.

Second Embodiment

The second embodiment of the present disclosure suggests a message format in a Signaling (S) layer in MMT.

Lists of messages signaled in an S1 layer which is one of sub layers of an S layer included in an MMT signaling functional area are as follows.

Message for transmitting all CI.

Messages for transmitting partial CI.

The partial CI refers to CI for a package, CI for an asset, CI for MPEG media presentation including space and temporary relations, CI for security, and CI for MPEG media access.

Lists of an S2 layer which is another sub layer of the S layer are as follows.

Message for transmitting the partial CI.

The partial CI refers to a Media Fragment Unit (MFU), a Media Processing Unit (MPU), an asset, and a structure of MCT.

Message for Application Layer-Forward Error Correction (AL-FEC) information.

Message for a Delivery (D) 1 payload structure.

Message for a D2 protocol structure.

Message for management including composition and report.

Message for transmitting D3 information.

Here, the lists of the messages may be updated based on the progress of CE.

The messages may be transmitted to in-band or out-of band means. An MMT delivery functional area defines a payload format for the in-band delivery of the message. Further, since the out-of band delivery of the messages does not correspond to an embodiment of the present disclosure, a description thereof will not be specified in this specification.

Here, mapping of messages for a Session Description Protocol (SDP) for the out-of band delivery may be defined as Internet Engineering Task Force Request for Comment (IETF RFC).

FIG. 1 illustrates a structure of the S layer in MMT according to an embodiment of the present disclosure.

Referring to FIG. 1, the S layer includes an S1 layer 100 and an S2 layer 120 and transmits messages generated by the S1 layer 100 and the S2 layer 120 to a D1 layer 140.

First, the S1 layer 100 may generate a message 102 for full CI, a message 104 for package information, a message 106 for asset information, a message 108 for controlling a presentation, a message 110 for security, and a message 112 for access.

Next, the S2 layer 120 may generate a message 122 for an Encryption (E) layer structure, that is, an MFU, an MPU, and an asset, a message 124 for a D1 payload structure, a message 126 for a D2 payload structure, a message 128 for measurement, a message 130 for AL-FEC, and a message 132 for transmitting D3 information.

Figure 2:
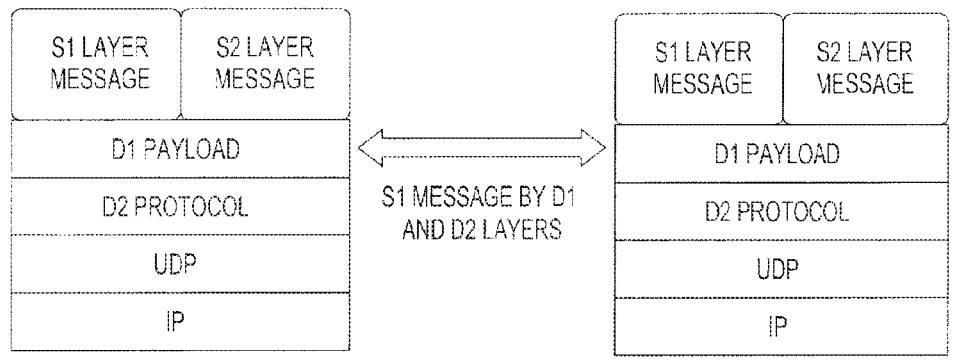
FIGS. 2, 3, and 4 illustrate examples of a protocol stack in which an S layer message can be transmitted according to the second embodiment of the present disclosure.
Figure 3:
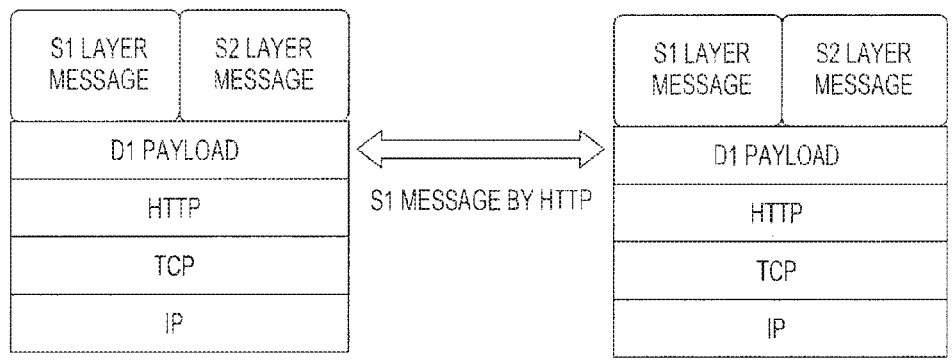
Figure 4:
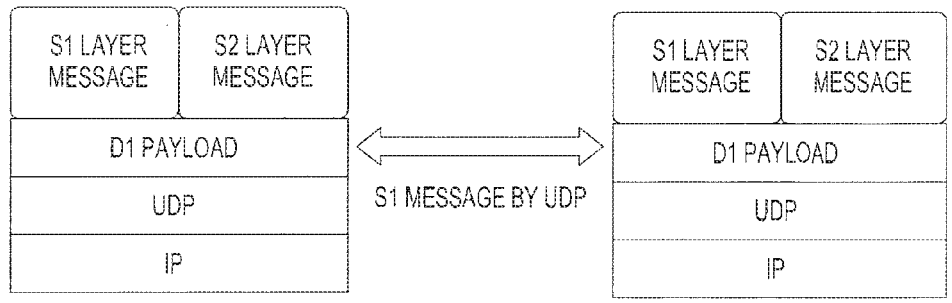

FIGS. 2 to 4 illustrate examples of protocol stacks in which the S1 layer message can be transmitted according to an embodiment of the present disclosure.

Referring to FIG. 2, for example, a protocol stack in which the S1 layer message can be transmitted by the D1 layer and the D2 layer includes a D1 payload, a D2 payload, a User Datagram Protocol (UDP), and an Internet Protocol (IP). In this case, a protocol stack of an S2 layer message is configured equally to the protocol stack of the S1 layer message.

Referring to FIG. 3, in another example, a protocol stack in which the S1 layer message can be transmitted by a Hyper Text Transfer Protocol (HTTP) includes a D1 payload, an HTTP, a Transmission Control Protocol (TCP), and an IP. Similarly, in this case, a protocol stack of the S2 layer message also includes the same components as those of the S1 layer message.

Referring to FIG. 4, in another example, a protocol stack in which the S1 layer message can be transmitted by the UDP includes a D1 payload, a UDP, and an IP. Similarly, in this case, a protocol stack of the S2 layer message is also configured equally to the protocol stack of the S1 layer message.

An MMT server determines one protocol stack for the S layer message illustrated in FIGS. 2 to 4 as described above.

Figure 5:
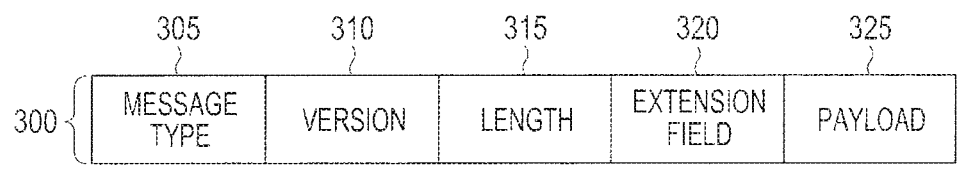
FIG. 5 illustrates an example of a structure of an S layer message according to the second embodiment of the present disclosure.

FIG. 5 illustrates an example of a structure of an S layer message according to an embodiment of the present disclosure.

Referring to FIG. 5, an S layer message 300 includes, for example, a message type file 305, a version field 310, a length field 315, an extension field 320, and a payload field 325.

The message type field 305 indicates which type of S layer information exists with the payload field 325. The message type field 305 has a fixed length of 1 byte. At this time, each S1 message value is shown in Table 2 below.

The version field 310 indicates a version of the S layer message. That is, an MMT client can determine through a value of the version field whether the received S layer message is new. Particularly, the version field 310 is useful when the S layer message is repeatedly transmitted in a broadcasting network. In this case, the version field also has a fixed length of 1 byte.

The length field 315 indicates a length of the S1 layer message.

Respective S layer messages require different pieces of information in headers. Accordingly, the extension field 320 provides additional information for each of the S layer messages. The payload field 325 transports S layer information which a corresponding S layer message desires to transmit.

Meanwhile, the number of assets included in one package is plural. Accordingly, in this case, information on each asset may be included in the form in which the message illustrated in FIG. 5 is repeated.

Table 2 below is a table indicating values of types of the S layer messages according to an embodiment of the present disclosure.

TABLE 2

| Message Type Value | S Layer Message | Comment |
| --- | --- | --- |
| 00000001 | Full CI | |
| 00000010 | CI information for Package | |
| 00000011 | CI information for Asset | |
| 00000100 | CI information for MPEG Media Presentation | |
| 00000101 | CI information for Security | |
| 00000110 | CI information for MPEG Media Access | |
| 00000111~01111111 | Reserved for Future Use for S1 Layer Message | |
| 10000000 | E layer entity structure | |
| 10000001 | D1 Payload Structure | |
| 10000010 | D2 Packet Structure | |
| 10000011 | AL-FEC information | |
| 10000100 | Measurement Configuration | |
| 10000101 | D3 information delivery | |
| 10000111~11111111 | Reserved for Future Use for S2 Layer Message | |

Referring to Table 2 above, a message type value indicates each of a plurality of S layer messages. The plurality of S layer messages include full CI, CI for a package, CI for an asset, CI for an MPEG media presentation, CI for security, reservation for the future use for the S1 layer message, a layer E entity structure, a D1 payload structure, a D2 packet structure, AL-FEC information, measurement configuration, D3 information delivery, and reservation for future use for the S2 layer message.

The S1 layer message for the full CI transmits the full CI. For example, the full CI refers to all information for describing one measurement package and may be understood as the content related to service guide. Further, a version of the S1 layer message for the full CI indicates whether the CI version is changed.

The CI for the package, that is, the S1 layer message transmits package information extracted from CI. The CI for the package may be usefully used for informing of package information before reception of full CI. Meanwhile, since a message type does not provide information on which package information is transmitted, an extension header transports an identification of one or more packages.

The CI for the asset, that is, the S1 layer message transmits asset information extracted from CI and may be efficiently used for informing of asset information before reception of full CI. In this case, since a message type does not provide information on which asset information is transmitted, the extension header transports identifications of assets in the package.

The CI for the MPEG media presentation, that is, the S1 layer message transmits an MPEG media presentation extracted CI. The CI for the MPEG media presentation may transport not only a part of the MPEG media presentation such as an update part but also a full MPEG media presentation. The extension header transports information of the MPEG media presentation such as a full version, a partial version or the like.

The CI for the security, that is, the S1 layer message transmits security information. The CI for the security transports a Conditional Access System (CAS), Digital Rights Management (DRM), and information on a downloadable CAS and downloadable DRM. In this case, the extension header transports information on which security information is transmitted, a security solution method, and a link between assets/packages.

The CI for the MPEG media access, that is, the S1 layer message transmits access information of MPEG media. The MPEG media may share the same access information. For example, all CI may include Uniform Resource Locators (URLs), and corresponding address information in broadcasting. In this case, the extension header provides lists of MPEG media which share the same access.

Since layer E entity structures may be different according to each package, the S2 layer message for the layer E entity structure transmits structures of layer E entities (e.g., MFU, MPU, and asset). In this case, the extension header has information on which layer E entity structure is given and an ID of MPEG media using the given layer E entity.

Since an MMT client should know a D1 payload structure before receiving a D1 payload, the S2 layer message for the D1 payload structure transmits the D1 payload structure. Further, D1 payload structures may be different according to each package. In this case, the extension header has information on MPEG media using the given D1 payload structure.

Since the MMT client should know a D2 packet structure before receiving a D2 packet, the S2 layer message for the D2 packet structure transmits the D2 packet structure. Further, D1 packet structures may be different according to each package. In this case, the extension header has information on MPEG media using the given D2 packet structure.

The S2 layer message for the AL FEC information transmits information of AL-FEC such as an AL FEC frame structure and a code.

The S2 layer message for the measurement configuration transmits management configuration information. Here, the management configuration denotes setting what should be measured, when it should be measured, how long it should be measured for, and when a result of the measurement should be reported.

The S2 layer message for the D3 information delivery transmits D3 information.

Figure 6:
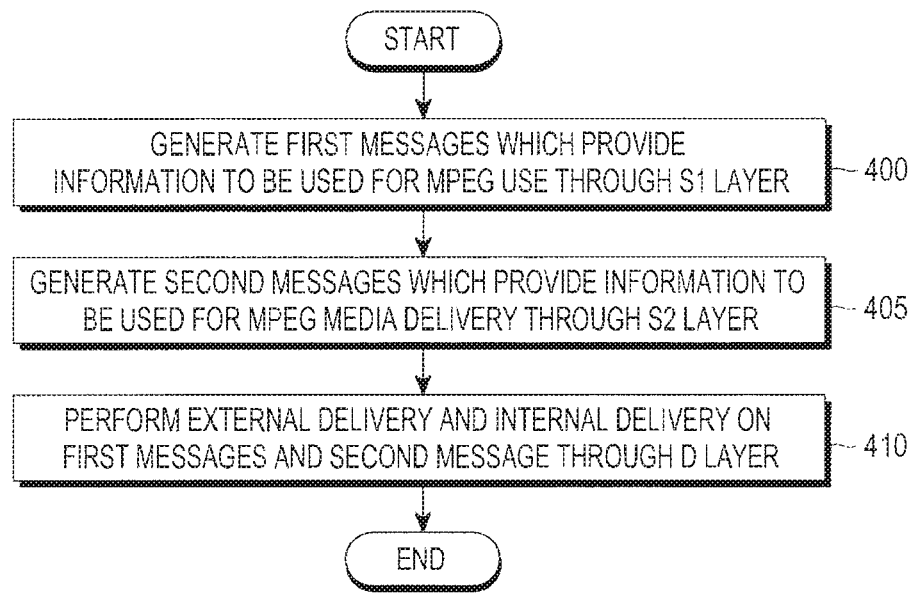
FIG. 6 is a flowchart illustrating an operation of an MMT server according to the second embodiment of the present disclosure.

FIG. 6 is a flowchart illustrating operations of an MMT server according to an embodiment of the present disclosure.

Referring to FIG. 6, the MMT server generates first messages which provide information to be used for MPEG through the S1 layer in operation 400. Here, the first messages correspond to, for example, the S1 layer message of Table 2 and each of the first messages has the structure of FIG. 3. Since a detailed description thereof overlaps the previous description, the description will be omitted hereinafter.

The MMT server generates second messages which provide information to be used for transmitting MPEG media through the S2 layer in operation 405. Similarly, the second messages correspond to, for example, S2 layer messages of Table 2 and each of the second messages has the structure of FIG. 5. Since a detailed description thereof overlaps the previous description, the description will be omitted hereinafter.

Then, in operation 410, the MMT server performs external delivery and internal delivery on the generated first message and second messages through layer D.

Third Embodiment

Figure 7:
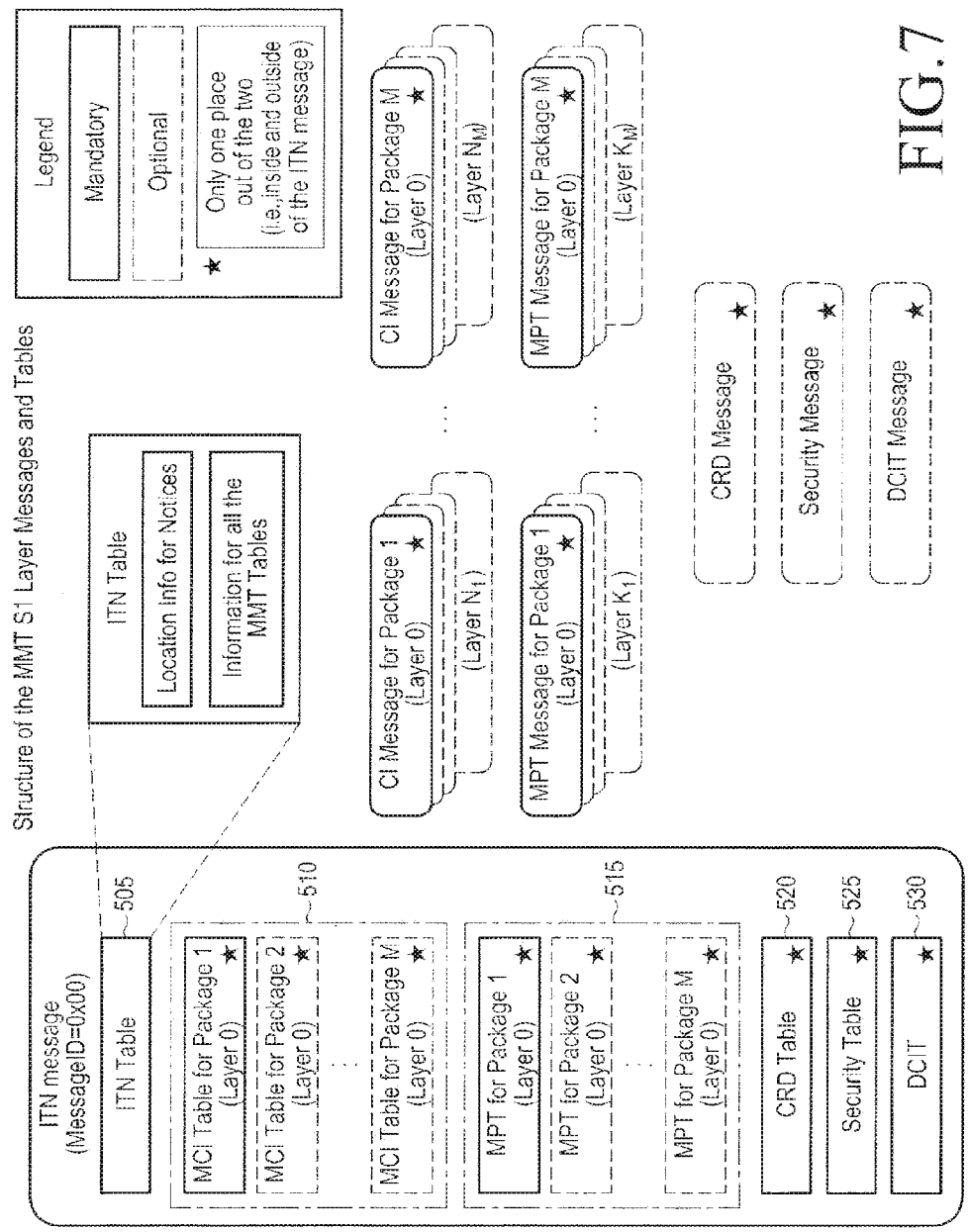
FIG. 7 illustrates an S1 signaling structure according to a third embodiment of the present disclosure.

FIG. 7 illustrates an S1 signaling structure according to the third embodiment of the present disclosure.

Six S1 layer messages according to another embodiment of the present disclosure will be described below.

(1) Message for Information on Tables and Notice (ITN): This message transmits an ITN table 505 and further transmits other tables which can be used for high access to the package. A role of the ITN is similar to that of MPEG-2, but also has different MMT specific functions. The ITN table includes full information on all other S1 tables. Further, the ITN has information on notice reception. The notice includes, for example, emergency alert, emergency notice and the like.

(2) Message for MMT Composition Information (MCI): This message transmits MMT CI including not only full CI but also layered CI.

(3) Message for Clock Reference Descriptors (CRD): This message transmits clock reference information to be used for mapping between an MMT system clock (that is, NTP clock) and another predetermined clock (for example, MPEG-2 or MPEG-4).

(4) Message for security information: This message transmits security information used for protecting MMT contents. A security system corresponds to DRM, downloadable DRM, and a downloadable conditional access system (D-CAS) information.

(5) Message for MMT Package Table (MPT): This message transmits an MMT package table. Complete or layer-0 MPT corresponds to an MMT package. This includes a global unique identification of the package, a position of MCI, complete or partial (if possible, layered MPT is used) lists of MMT assets included in the MMT package. Further, this includes a package type, a package name, a package short description, a parental rating, an audio language, a text language, a target user profile, a requested device capability, and a package policy such as record permission and high speed play permission. A role of the MPT is similar to that of MPEG2 PMT, but also has many more functions for the MMT purpose.

(6) Message for Device Capability Information Table (DCIT): This message transmits a Device Capability Information Table (DCIT). Device capability information provides a request for MPEG media content consumption and/or recommended device capability.

Further, according to the third embodiment of the present disclosure, three descriptors below are defined.

(1) Language descriptor.
(2) Clock reference descriptor.
(3) D-CAS descriptor.

Hereinafter, S1 layer messages, tables, and syntax and semantics of descriptors.
I. Layer Message, Tables, and Syntax and Semantics of Descriptors
1. Message for ITN This message transmits the ITN table 505. A role of the ITN is similar to that of MPEG-2 Program Association Table (PAT), but also has other MMT specific functions. The ITN table includes full information on other S1 tables.

Further, the ITN has information related to notice reception. In general, the notice includes, for example, emergency alert, emergency notice and the like.

An ITN message, that is, a message including the ITN may further include one or more MMT Package Tables (MPTs) corresponding to the MMT package. The MPT includes a global unique identification of the package, a position of MCI, complete or partial (if possible, layered MPT is used) lists of MMT assets included in the MMT package. Further, the MPT includes a package type, a package name, a package short description, a parental rating, an audio language, a text language, a target user profile, a requested device capability, and a package policy such as record permission and high speed play permission. A role of the MPT is similar to that of MPEG2 PMT, but also has many more functions for the MMT purpose.

When the ITN message includes only one MPT, a media delivery service provides a user with only one package at a predetermined fixed time instant. When the ITN table includes multiple MPTs overlapping in a time line, the media delivery service provides the user with multiple packages at a predetermined fixed time instant. When the ITN table does not have overlapping and corresponding packages include multiple MPTs associated with the same logical channel, the media delivery service sequentially provides the user with multiple packages according to a time sequence.

The S layer message having MessageID=0x00 should include the ITN table. Further, a payload ID of an asset path in an IP application data flow in which the S layer message having MessageID=0x00 is transmitted is fixed to "0x0000". The receiver is required to read and analyze the ITN message before reading predetermined other messages.

In general, the ITN message is periodically transmitted on a very short cycle, for example, 500 ms in a broadcast environment in order to guarantee short power up delay or short zapping time.

(1) ITN Message Syntax and Semantic

Syntax of the ITN message is defined in Table 3, and semantic of syntax elements thereof is provided below Table 3. A method of defining the syntax is based on a method of MPEG-2 system standard (ISO/IEC 13818-1). Indication indicating no loop count in a "value" column may be inferred from a length of the table. The same rule is applied to other tables in the present specification.

TABLE 3

| Syntax | Value | No. of bits | Format |
|---|---|---|---|
| ITN_message ( ) { | | | |
|   message_id | 0x00 | 8 | uimsbf |
|   version | | 8 | uimsbf |
|   length | | 16 | uimsbf |
|   extension_fields { | | | |
|     ITN_transmission_info { | | | |
|       reserved | '1111 | 7 | bslbf |
|       start_time_flag | 111' | 1 | bslbf |

TABLE 3-continued

| Syntax | Value | No. of bits | Format |
|---|---|---|---|
|       if (start_time_flag ==1) { | | | |
|         start_time | | 64 | uimsbf |
|       } | | | |
|       retransmission_period | | 16 | uimsbf |
|     } | | | |
|     number_of_tables | | 8 | uimsbf |
|     for (i=0; i<N1; 1++) { | N1 | | |
|       table_id | | 8 | uimsbf |
|       table_version | | 8 | uimsbf |
|       table_length | | 16 | uimsbf |
|     } | | | |
|   } | | | |
|   Payload { | | | |
|     for (i=0; i<N1; i++) { | | | |
|       table( ) | | | |
|     } | | | |
|   } | | | |
| } | | | |

Message_id: This indicates a type of the S layer message. A length of this field is 8 bits. The ITN message has a fixed message_id of 0x00.

Version: This indicates a version of the S layer message. The MMT client may check whether the received S layer message is new. Particularly, this field is useful when the S layer message is repeatedly transmitted through a broadcasting network. A length of this field is 8 bits.

Length: This indicates a length of the S1 layer message. A length of this field is 16 bits. This indicates a length of the ITN message counted at a starting byte from the next field to a last byte of the ITN message. "0" is not used in this field.

Start_time_flag: When this flag is "1", additional syntax element start time is used.

Start_time: This indicates a start time in NPT of ITN message transmission.

Retransmission_period: This indicates a retransmission time of the ITN message. A unit of retransmission_period is 10 ms.

Number_of_tables: This indicates a number of tables included in the ITN message.

Table_id: This indicates a table identification of the table included in the ITN message.

Table_version: This indicates a version of the table included in the ITN message. This corresponds to a copy of the version field in the table included in payload of the ITN message.

Table_length: This indicates a length of the table included in the ITN message. This corresponds to a copy of the length field in the table included in payload of the ITN message. An actual length of the table is a table length+4.

Table( ): This indicates an S layer table. Table in the payload has the same sequence as that of table_id in the extension field.

(2) ITN Table Syntax and Semantic

Syntax of the ITN table is defined in Tables 4 and 5, and semantic of syntax elements thereof is provided below Tables 4 and 5.

TABLE 4

| Syntax | Value | No. of bits | Format |
|---|---|---|---|
| ITN_table ( ) { | | | |
|   table_id | | 8 | uimsbf |
|   version | | 8 | uimsbf |

TABLE 4-continued

| Syntax | Value | No. of bits | Format |
|---|---|---|---|
| length | | 16 | uimsbf |
| notice_reception { | | | uimsbf |
|   reserved | '1111 | 7 | bslbf |
|   method_flag | 111' | 1 | bslbf |
|   if(method_flag == 0) { | | | |
|     IP_broadcast_delivery { | | | |
|       MMT_general_location_info( ) | | | |
|     } | | | |
|   } else { | | | |
|     poll_URL { | | | |
|       MMT_general_location_info( ) | | | |
|     } | | | |
|     poll_period | | 16 | uimsbf |
|   } | | | |
| } | | | |
| information_table_info { | | | |
|   number_of_tables | | 8 | uimsbf |
|   for (i=0; i<N1; i++) { | N1 | | |
|     information_table_id | | 8 | uimsbf |
|     information_table_version | | 8 | uimsbf |
|     package_path_number | | 16 | uimsbf |
|     location { | | | |
|       MMT_general_location_info( ) | | | |
|     } | | | |
|     reserved | | 6 | bslbf |
|     second_location_flag | '1111 | 1 | bslbf |
|     table_filter_code_flag | 11' | 1 | bslbf |
|     if (second_location_flag == 1) { | | | |
|       second_location { | | | |
|         MMT_general_location_info( ) | | | |
|       } | | | |
|     } | | | |
|     if (table_filter_code_flag == 1) { | | | |
|       table_filter_codes { | | | |
|         number_of_languages_for_table_filter_codes | | 8 | uimsbf |

TABLE 5

| | | | |
|---|---|---|---|
| for (j=0; j<N2; j++) { | N2 | | |
|   table_filter_code_language | | 24 | uimsbf |
|   number_of_table_filter_codes | | 8 | |
|   for (k=0; k<N3; k++) { | N3 | | |
|     table_fileter_code_length | | 8 | uimsbf |
|     for (m=0; m<N4; m++) { | N4 | | |
|       table_fileter_code_byte | | 8 | uimsbf |
|     } | | | |
|   } | | | |
| } | | | |
| } | | | |
| } | | | |
| } | | | |
| reserved | | 7 | bslbf |
| private_extension_flag | '1111 | 1 | bslbf |
| if (private_extension_flag == 1) | 111' | | |
|   private_extension { | | | |
|   } | | | |
| } | | | |

Table_id: This indicates a table identification of the ITN table.

Version: This indicates a version of the ITN table. A newer version overrides an old version upon receipt.

Length: This indicates a length of the ITN table counted at a starting byte from the next field to a last byte of the ITN table. "0" is not used in this field.

Method_flag: This indicates a notification reception method. When this flag is "0", notification is transmitted by IP broadcast delivery. When this flag is "1", notification is transmitted through an interaction channel. For the IP broadcast delivery, an IP address and an IP port number are provided. For the delivery through the interaction channel, a URL by which a client can poll notification through the interaction channel is provided.

MMT_general_location_info( ): This indicates general location reference information defined in Table 6 to Table 8 in section 1 (3) of the third embodiment. Actual location is dependent on syntax element location_type within MMT_general_location_info( ).

MMT_general_location_info( ) for IP_broadcast_delivery: Only location_type=0x14 and 0x15 are allowed for IP_broadcast_delivery.

MMT_general_location_info( ) for poll_URL: Only location_type=0x0E is allowed for poll_URL.

Poll_period: During polling of notification, it is expected that a client or a receiver polls a notification URL, poll_URL, or all poll_period seconds.

Number_of_tables: This indicates a number of information tables provided in the ITN table.

Information_table_id: This indicates an identification of the information table provided in the ITN table. Table_id of the ITN is not shown therein.

Information_table_version: This indicates a version of the information table provided in the ITN table.

Package_path_number: This indicates an identification of a logical channel including the information table. A broadcaster allocates an inherent identification to a logical channel within a physical channel. "0" is specially used and is not used as an identification. When this field is "0", the information table is channel-independent, that is, the table information has service-wide information.

MMT_general_location_info( ) for location: This indicates an address from which a client acquires the information table. Only location_type=0x0F~0x13 are allowed.

Second_location_flag: When this flag is set, an alternative address from which a client acquires the information table is provided.

Table_filter_code_flag: When this flag is set, one or more table filter codes are provided. The table filter code specifies a reference based on which tables are grouped. When there are a plurality of references for grouping, all the grouping references are applied to the information table.

MMT_general_location_info( ) for second_location: This indicates an alternative address from which a client acquires the information table. Only 0x0F~0x13 are allowed.

Number_of_table_filter_codes: This indicates a number of a table filter code for the information table.

Language_for_all_table_filter_codes: This indicates languages of all the following table_filter_codes. A language code is 3-byte language identification defined in the ISO 639 standard.

Table_filter_code_language_flag: When this flag is "1", a language for the following table_filter_code is separately specified and overrides a language provided by language_for_all_table_filter_codes. A language code is a 3-byte language identification defined in the ISO 639 standard.

Table_filter_code_language: This indicates a language of the following table_filter_code. A language code is a 3-byte language identification defined in the ISO 639 standard.

Table_filter_code_length: This indicates a byte length of table_filter_code.

Table_filter_code_byte: This indicates a byte in table_filter_code.

Private_extension_flag: When this flag is "1", a private extension exists.

Private_extension( ): This indicates a syntax element group acting as a container for ownership or an application specific extension.

(3) MMT_general_location_info( ) Syntax Element Group

An MMT_general_location_info( ) syntax element group is used for providing location information. Syntax of MMT_general_location_info( ) is defined in Table 6 to Table 8 and semantic of syntax elements thereof is provided below Table 6 to Table 8.

TABLE 6

| Syntax | Value | No. of bits | Format |
|---|---|---|---|
| MMT_general_location_info( ) { | | | |
| location_type | | 8 | uimsbf |
| if (location_type = 0x00) { | | | |
| } else if (location_type == 0x01) { | | | |
| payload_id | | 16 | uimsbf |
| } else if (location_type == 0x02) { | | | |
| } else if (location_type == 0x03) { | | | |
| ipv4_src_addr | | 32 | uimsbf |
| ipv4_dst_addr | | 32 | uimsbf |
| dst_port | | 16 | uimsbf |
| payload_id | | 16 | uimsbf |
| } else if (location_type == 0x04) { | | | |
| } else if (location_type == 0x05) { | | | |
| ipv6_src_addr | | 32 | uimsbf |
| ipv6_dst_addr | | 32 | uimsbf |
| dst_port | | 16 | uimsbf |
| payload_id | | 16 | uimsbf |
| } else if (location_type == 0x06) { | | | |
| } else if (location_type == 0x07) { | | | |
| reserved | '111' | 3 | bslbf |
| MPEG_2_PID | | 13 | uimsbf |
| } else if (location_type == 0x08) { | | | |
| MPEG_2_transport_stream_id | | 16 | uimsbf |
| reserved | '111' | 3 | bslbf |
| MPEG_2_PID | | 13 | uimsbf |
| } else if (location_type == 0x09) { | | | |
| network_id | | 16 | uimsbf |
| MPEG_2_transport_stream_id | | 16 | uimsbf |
| reserved | '111' | 3 | bslbf |
| MPEC_2_PID | | 13 | uimsbf |
| } else if (location_type == '0x0A') { | | | |
| byte_offset | | 16 | uimsbf |
| length | | 16 | uimsbf |
| } else if (location_type == '0x0B') { | | | |
| prefix_index | | 8 | uimsbf |
| URL_length | N1 | 8 | uimsbf |

TABLE 7

| | | | |
|---|---|---|---|
| For (i=0; i<N1; i++) { | | | |
| URL_byte | | 8 | uimsbf |
| } | | | |
| } else if (location_type == '0x0C') { | | | |
| prefix_index | | 8 | uimsbf |
| URL_length | N2 | 8 | uimsbf |
| For (i=0; i<N2; i++) { | | | |
| URL_byte | | 8 | uimsbf |
| } | | | |
| byte_offset | | 16 | uimsbf |
| length | | 16 | uimsbf |
| } else if (location_type == '0x0D') { | | | |
| } else if (location_type == '0x0E') { | | | |
| URL_length | N3 | 16 | uimsbf |
| For (i=0; i<N1; i++) { | | | |
| URL_byte | | 8 | uimsbf |
| } | | | |
| } else if (location_type == '0x0F') { | | | |
| } else if (location_type == '0x10') { | | | |
| message_id | | 8 | uimsbf |
| } else if (location_type == '0x11') { | | | |
| payload_id | | 16 | uimsbf |
| message_id | | 8 | uimsbf |
| } else if (location_type == '0x12') { | | | |
| ipv4_src_addr | | 32 | uimsbf |
| ipv4_dst_addr | | 32 | uimsbf |
| dst_port | | 16 | uimsbf |
| payload_id | | 16 | uimsbf |
| message_id | | 8 | uimsbf |
| } else if (location_type == '0x13') { | | | |
| ipv6_src_addr | | 64 | uimsbf |
| ipv6_dst_addr | | 64 | uimsbf |
| dst_port | | 16 | uimsbf |
| payload_id | | 16 | uimsbf |
| message_id | | 8 | uimsbf |
| } else if (location_type == '0x14') { | | | |
| ipv4_addr | | 32 | uimsbf |
| port | | 16 | uimsbf |
| } else if (location_type == '0x15') { | | | |
| ipv6_addr | | 64 | uimsbf |

TABLE 8

| | | |
|---|---|---|
| port | 16 | uimsbf |
| } else { | | |
| } | | |
| } | | |

Location_type: This field indicates a type of location information as defined in Table 9.

TABLE 9

| Value | Meaning |
|---|---|
| 0x00 | Reserved |
| 0x01 | An asset path in the same IP application data flow as the one that carries the data structure to which this MMT_general_location_info( ) belongs |
| 0x02 | Reserved |
| 0x03 | An asset path in an IP version 4 application data flow |
| 0x04 | Reserved |
| 0x05 | An asset path in an IP version 6 application data flow |
| 0x06 | Reserved |
| 0x07 | An elementary stream (ES) in the same MPEG-2 TS as the one that carries the data structure to which this MMT_general_location_info( ) belongs |
| 0x08 | An elementary stream (ES) in a MPEG-2 TS in the same broadcast network as the one that carries the data structure to which this MMT_general_location_info( ) belongs |
| 0x09 | An elementary stream (ES) in a MPEG-2 TS in a broadcast network |
| 0x0A | A data block specified by a byte rage in the same data structure or the same file as the one to which this MMT_general_location_info( ) belongs. A byte range is composed of the byte offset of the first byte of the data block from the first byte of a data structure or a file and the length of the data block in bytes. |
| 0x0B | A URL with prefix |
| 0x0C | A byte range in the file addressed by a URL |
| 0x0D | A location information previously stored (i.e. pushed into a memory stack) within a receiver |
| 0x0E | A URL |
| 0x0F | The same S layer message that includes the MMT_general_location_info( ) |
| 0x10 | An S layer message delivered in the same asset path as the one that carries the data structure to which this MMT_general_location_info( ) belongs. |
| 0x11 | An S layer message delivered in an asset path in the same IP application data flow as the one that carries the data structure to which this MMT_general_location_info( ) belongs. |
| 0x12 | An S layer message delivered in an asset path in an IP version 4 application data flow |
| 0x13 | An S layer message delivered in an asset path in an IP version 6 application data flow |
| 0x14 | An IP version 4 application data flow |
| 0x15 | An IP version 6 application data flow |
| 0x16~0xFF | reserved for future use |

Payload_id: This indicates an inherent asset path identification within an IP application data flow.

Ipv4_src_addr: This indicates an IP version 4 source address of an IP application data flow.

Ipv4_dst_addr: This indicates an IP version 4 destination address of an IP application data flow.

Dst_port: This indicates a destination port number of an IP application data flow.

Ipv6_src_addr: This indicates an IP version 6 source address of an IP application data flow.

Ipv6_dst_Addr: This indicates an IP version 6 destination address of an IP application data flow.

Network_id: This indicates an identification of a broadcast network transmitting MPEG-2 TS.

MPEG-2_transport_stream_id: This indicates an MPEG-2 TS identification.

MPEG-2_PID: This indicates a PID of an MPEG-2 packet.

Prefix_index: This indicates an index for a prefix defined before this syntax element group.

URL_length: This indicates a byte unit length of a URL. A termination null (0x00) should not be counted.

URL_byte: This indicates byte data in a URL. A termination null (0x00) should not be included.

Byte_offset: This indicates a byte offset from a first byte of a file.

Length: This indicates a length of a byte unit.

Message_id: This indicates an identification of the S layer message.

Ipv4_addr: This indicates an IP version 4 address of an IP application data flow.

Ipv6_addr: This indicates an IP version 6 address of an IP application data flow.

2. Message for MMT CI

MMT CI is transmitted by a CI message for out-of band signaling. The CI message may deliver complete CI or layered CI. When the layered CI is delivered, it is highly recommended to transmit layer-0 CI by an ITN message in order to reduce a time required for package consumption in a broadcast scenario. When the layer-0 CI is transmitted within the ITN message as indicated by reference numeral 510, CI should be capsulated in an MCI (MMT CI) table before the CI is inserted into the ITN message.

When a layered CI mechanism is used, layer-N CI (here, N is not 0) is generally transmitted in CI messages having a changed repetitive period and different message identifications.

(1) CI Message Syntax and Semantic

CI message syntax is defined in Table 10 and semantic of syntax elements thereof is provided below Table 10.

TABLE 10

| Syntax | Value | No. of bits | Format |
|---|---|---|---|
| CI_message ( ) { | | | |
|   message_id | | 8 | uimsbf |
|   version | | 8 | uimsbf |
|   length | | 16 | uimsbf |
|   extension_fields { | | | |
|     CI_transmission_info { | | | |
|       reserved | '1111 | 7 | bslbf |
|       start_time_flag | 111' | 1 | bslbf |

TABLE 10-continued

| Syntax | Value | No. of bits | Format |
|---|---|---|---|
|     if (start_time_flag ==1) { | | | |
|       start_time | | 64 | uimsbf |
|     } | | | |
|     retransmission_period | | 16 | uimsbf |
|   } | | | |
| } | | | |
| Payload { | | | |
|   for (i=0; i<N1; i++) { | | | |
|     CI_byte | | 8 | uimsbf |
|   } | | | |
| } | | | |
| } | | | |

Message_id: This indicates a type of the S layer message. A length of this field is 8 bits. The S layer message should have a separate message_id when a separate CI layer for a separate package transmits CI.

Version: This indicates a version of the S layer message. The MMT client may check whether the received S layer message is new. Particularly, this field is useful when the S layer message is repeatedly transmitted through a broadcasting network. A length of this field is 8 bits.

Length: This indicates a length of the S layer message. A length of this field is 16 bits. This indicates a length of a CI message counted at starting bytes from the next field to a last byte of the CI message. "0" is not used for this field.

Start_time_flag: When this flag is "1", additional syntax element start_time is used.

Start_time: This indicates a start time in NPT of CI message transmission.

Retransmission_period: This indicates a retransmission time of the CI message. A unit of retransmission_period is 10 ms.

CI_byte: This indicates a byte in CI.

(2) MCI Table Syntax and Semantic

MCI table syntax is defined in Table 10 and semantic of syntax elements thereof is provided below Table 10. The MCI table should be used only for complete CI or layer-0 CI.

TABLE 11

| Syntax | Value | No. of bits | Format |
|---|---|---|---|
| MCI_table ( ) { | | | |
|   table_id | | 8 | uimsbf |
|   version | | 8 | uimsbf |
|   length | | 16 | uimsbf |
|   for (i=0; i<N1; i++) { | | | |
|     CI_byte | | 8 | uimsbf |
|   } | | | |
| } | | | |

Table_id: This indicates a table identification of the MCI table.

Version: This indicates a version of the MCI table. A newer version overrides an old version upon receipt.

Length: This indicates a length of the MCI table counted at starting bytes from the next field to a last byte of the MCI table. "0" is not used for this field.

CI_byte: This indicates a byte in CI.

3. Message for a Clock Reference Descriptor (CRD)

A CRD defined in section 7 (2) of the third embodiment is delivered within a CRD message. One CRD message may include multiple CRDs.

When the CRDs are transmitted with the ITN message as indicated by reference numeral 520, the CRDs should be capsulated into a structure of a table called a CRD table.

(1) CRD Message Syntax and Semantic

CRD message syntax is defined in Table 12, and semantic of elements thereof is provided below Table 12.

TABLE 12

| Syntax | Value | No. of bits | Format |
|---|---|---|---|
| CRD_message ( ) { | | | |
|   message_id | | 8 | uimsbf |
|   version | | 8 | uimsbf |
|   length | | 16 | uimsbf |
|   extension_fields { | | | |
|     CRD_transmission_info { | | | |
|       reserved | '1111 | 7 | bslbf |
|       start_time_flag | 111' | 1 | bslbf |
|       if (start_time_flag ==1) { | | | |
|         start_time | | 64 | uimsbf |
|       } | | | |
|       retransmission_period | | 16 | uimsbf |
|     } | | | |
|   } | | | |
|   Payload { | | | |
|     for (i=0; i<N1; i++) { | | | |
|       clock_reference_descriptor( ) | | | |
|     } | | | |
|   } | | | |
| } | | | |

Message_id: This indicates a type of the S layer message. A length of this field is 8 bits.

Version: This indicates a version of the S layer message. The MMT client may check whether the received S layer message is new. Particularly, this field is useful when the S layer message is repeatedly transmitted through a broadcasting network. A length of this field is 8 bits.

Length: This indicates a length of the S layer message. A length of this field is 16 bits. This indicates a length of the CI message counted at starting bytes from the next field to a last byte of the CI message. "0" is not used for this field.

Start_time_flag: When this flag is "1", additional syntax element start_time is used.

Start_time: This indicates a start time in NPT of CRD message transmission.

Retransmission_period: This indicates a retransmission time of the CRD message. A unit of retransmission_period is 10 ms.

Clock_reference_descriptor( ): This is defined in section 7 (2) of the third embodiment.

(2) CRD table syntax is defined in Table 13, and semantic of syntax elements thereof is provided below Table 13. An MCI table should be used only for complete CI or layer-0 CI.

TABLE 13

| Syntax | Value | No. of bits | Format |
|---|---|---|---|
| CRD_table ( ) { | | | |
|   table_id | | 8 | uimsbf |
|   version | | 8 | uimsbf |
|   length | | 16 | uimsbf |
|   for (i=0; i<N1; i++) { | | | |
|     clock_reference_descriptor( ) | | | |
|   } | | | |
| } | | | |

Table_id: This indicates an identification of the CRD table.

Version: This indicates a version of the CRD table. A newer version overrides an old version upon receipt.

Length: This indicates a length of the CRD table counted at starting bytes from the next field to a last type of the CRD table. "0" is not used for this field.

Clock_reference_descriptor( ): This is defined in section 7 (2) of the third embodiment.

4. Message for Security

Security information is delivered within a security message or an ITN message. When the security information is transmitted within the ITN message as indicated by reference numeral 525, the security information should be capsulated before the security information is inserted into the ITN message.

(1) Security Message Syntax and Semantic

Security message syntax is defined in Table 14, and semantic of syntax elements thereof is provided below Table 14.

TABLE 14

| Syntax | Value | No. of bits | Format |
|---|---|---|---|
| Security_message ( ) { | | | |
| message_id | | 8 | uimsbf |
| version | | 8 | uimsbf |
| length | | 16 | uimsbf |
| extension_fields { | | | |
| Security_transmission_info { | | | |
| reserved | '1111 111' | 7 | bslbf |
| start_time_flag | | 1 | bslbf |
| if (start_time_flag ==1) { | | | |
| start_time | | 64 | uimsbf |
| } | | | |
| retransmission_period | | 16 | uimsbf |
| } | | | |
| } | | | |
| Payload { | | | |
| for (i=0; i<N1; i++) { | | | |
| Security_descriptor( ) | | | |
| } | | | |
| } | | | |
| } | | | |

Message_id: This indicates a type of the S layer message. A length of this field is 8 bits.

Version: This indicates a version of the S layer message. The MMT client may check whether the received S layer message is new. Particularly, this field is useful when the S layer message is repeatedly transmitted through a broadcasting network. A length of this field is 8 bits.

Length: This indicates a length of the S layer message. A length of this field is 16 bits. This indicates a length of the CI message counted at starting bytes from the next field to a last byte of the CI message. "0" is not used for this field.

Start_time_flag: When this flag is "1", additional syntax element start_time is used.

Start_time: This indicates a start time in the NPT of security message transmission.

Retransmission_period: This indicates a retransmission time of the security message. A unit of retransmission_period is 10 ms.

Security_descriptor( ): This is defined in section 7 (3) of the third embodiment.

(2) Security Table Syntax and Semantic

Security table syntax is defined in Table 15, and semantic of syntax elements thereof is provided below Table 15.

TABLE 15

| Syntax | Value | No. of bits | Format |
|---|---|---|---|
| Security_table ( ) { | | | |
| table_id | | 8 | uimsbf |

TABLE 15-continued

| Syntax | Value | No. of bits | Format |
|---|---|---|---|
| version | | 8 | uimsbf |
| length | | 16 | uimsbf |
| for (i=0; i<N1; i++) { | | | |
| Security_descriptor( ) | | 8 | uimsbf |
| } | | | |
| } | | | |

Table_id: This indicates an identification of the security table.

Version: This indicates a version of the security table. A newer version overrides an old version upon receipt.

Length: This indicates a length of the security table counted at starting bytes from the next field to a last type of the security table. "0" is not used for this field.

Security_descriptor( ): This is defined in section 7 (3) of the third embodiment.

5. Message for an MPT (MMT Package Table)

Referring to FIG. 5, an MMT Package Table (MPT) delivers all pieces of information on a single package. The S layer message transmitting the MPT is called an "MPT" message. The MPT may be included in the ITN message having different tables as indicated by reference numeral 515 or may be transmitted in a separate MPT message.

For layered delivery of the package having the layered CI, the MPT may be partitioned into multiple layered MPTs. The layer-0 MPT is a basic MPT. When the layered delivery is not used, only the layer-0 MPT is delivered. When the MPT is transmitted in the separate MPT message as described above, the layer-0 MPT is a complete MPT. MPTs in different layers should have different table identifications (table_ids). In this standard, to provide eight MPT layers, eight different values are allocated to MPT table-ids. As a value of the MPT table_id is smaller, the MPT layer is closer to the basic MPT.

When the layered MPT is used within the ITN message to reduce a time to acquire the package in a broadcast scenario, it is highly recommended to transmit the complete MPT or the layer-0 MPT.

(1) MPT Message Syntax and Semantic

MPT message syntax is defined in Table 16, and semantic of syntax elements thereof is provided below Table 16. The MPT message transmits only one complete MPT or layer-N MPT when MPT layering is used.

TABLE 16

| Syntax | Value | No. of bits | Format |
|---|---|---|---|
| MPT_message ( ) { | | | |
| message_id | | 8 | uimsbf |
| version | | 8 | uimsbf |
| length | | 16 | uimsbf |
| extension_fields { | | | |
| MPT_transmission_info { | | | |
| reserved | '1111 111' | 7 | bslbf |
| start_time_flag | | 1 | bslbf |
| if (start_time_flag ==1) { | | | |
| start_time | | 64 | uimsbf |
| } | | | |
| retransmission_period | | 16 | uimsbf |
| } | | | |
| } | | | |
| Payload { | | | |
| MMT_package_table( ) | | | |
| } | | | |
| } | | | |

Message_id: This indicates a type of the S layer message. A length of this field is 8 bits.

Version: This indicates a version of the S layer message. The MMT client may check whether the received S layer message is new. Particularly, this field is useful when the S layer message is repeatedly transmitted through a broadcasting network. A length of this field is 8 bits.

Length: This indicates a length of the S layer message. A length of this field is 16 bits. This indicates a length of the MPT message counted at starting bytes from the next field to a last byte of the MPT message. "0" is not used for this field.

Start_time_flag: When this flag is "1", additional syntax element start_time is used.

Start_time: This indicates a start time in NPT of MPT message transmission.

Retransmission_period: This indicates a retransmission time of the MPT message. A unit of retransmission_period is 10 ms. When layered MPTs are used, retransmission_period of a higher layer MPT is generally longer than retransmission_period of an MPT layer lower than the higher layer MPT.

MMT_package_table( ): This is defined in section 5 (2) of the third embodiment.

(2) MPT Syntax and Semantic

MPT( ) syntax is defined in Table 17 to Table 19, and semantic of syntax elements thereof is provided below Table 17 to Table 19.

TABLE 17

| Syntax | Value | No. of bits | Format |
|---|---|---|---|
| MMT_package_table( ) { | | | |
|     table_id | | 8 | uimsbf |
|     version | | 8 | uimsbf |
|     length | | 16 | uimsbf |
|     MMT_package_id | | 64 | uimsbf |
|     If (table_id == Layer0_MPT_id) { | | | |
|         MPT_descriptors { | | | |
|             MPT_descriptors_length | N1 | 16 | uimsbf |
|             for (i=0; i<N1; i++){ | | | |
|                 MPT_descriptors_byte | | 8 | uimsbf |
|             } | | | |
|         } | | | |
|     package_type | | 8 | uimsbf |
|     package_name { | | | |
|         number_of_languages_for_name | | 8 | uimsbf |
|         for (j=0; j<N2; j++) { | | | |
|             language_code_for_name | | 24 | uimsbf |
|             name_length | N3 | 8 | uimsbf |
|             for (j=0; j<N3; j++) { | | | |
|                 name_byte | | 8 | uimsbf |
|             } | | | |
|         } | | | |
|     } | | | |
|     package_description { | | | |
|         number_of_languages_for_description | N4 | 8 | uimsbf |
|         for (j=0; j<N4; j++) { | | | |
|             language_code_for_description | | 24 | uimsbf |
|             description_length | N5 | 8 | uimsbf |
|             for (j=0; j<N5; j++) { | | | |
|                 description_byte | | 8 | uimsbf |
|             } | | | |
|         } | | | |
|     } | | | |
|     audio_languages { | | | |
|         number_of_audio_languages | | 8 | uimsbf |
|         for (j=0; j<N6; j++) { | | | |
|             audio_language_code | | 24 | uimsbf |
|         } | | | |
|     } | | | |

TABLE 18

| | | |
|---|---|---|
| text_languages { | | |
|     number_of_text_languages | 8 | uimsbf |
|     for (j=0; j<N7; j++) { | | |
|         text_language_code | 24 | uimsbf |
|     } | | |
| } | | |
| target_user_profiles { | | |
|     number_of_target_user_profiles | 8 | uimsbf |
|     for (j=0; j<N8; j++) { | | |
|         target_user_profile_id | 8 | uimsbf |
|     } | | |
| } | | |

TABLE 18-continued

```
    required_device_capability_profiles {
        number_of_required_device_capability_profiles          8 uimsbf
        for (j=0; j<N9; j++) {
            required_device_capability_profile_id              8 uimsbf
        }
    }
    reserved                                         '111'     3 bslbf
    parental_guidance_flag                                     1 bslbf
    package_policy {
        recording_flag                                         1 bslbf
        fast_play_flag                                         1 bslbf
    }
    clock_reference_flag                                       1 bslbf
    protection_scheme_id_flag                                  1 bslbf
    if (clock_reference_flag == 1) {
        clock_reference_id                                     8 uimsbf
        reserved                                     '1111     7 bslbf
        timescale_flag                               111'      1 bslbf
        if (time_scale_flag == 1) {
            timescale                                         32 uimsbf
        }
    }
    if (protection_scheme_id_flag == 1) {
        protection_scheme_id                                   8 uimsbf
    }
}
CI_location {
    MMT_general_location_info( )
}
number_of_assets                                               8 uimsbf
                                                  N6
```

TABLE 19

```
for (i=0; i<N6; i++) {
    asset_type                                                 8 uimsbf
    asset_id                                                  16 uimsbf
    reserved                                         '1111     6 bslbf
    asset_clock_reference_flag                       11'       1 bslbf
    asset_protected_flag                                       1 bslbf
    if (asset_clock_reference_flag == 1) {
        asset_clock_reference_id                               8 uimsbf
        reserved                                               7 bslbf
        asset_timescale_flag                         '1111     1 bslbf
        if (asset_time_scale_flag == 1) {            111'
            asset_timescale                                   32 uimsbf
        }
    }
    if (asset_protected_flag == 1) {
        reserved                                               7 bslbf
        asset_protection_scheme_id_flag                        1 bslbf
        if (asset_protection_scheme_id_flag == 1) {  '111
            asset_protection_scheme_id               1111'     8 uimsbf
        }
    }
    asset_location {
        MMT_general_location_info( )
    }
    asset_descriptors {
        asset_descriptors_length                              16 uimsbf
        for (k=0; k<N10; k++) {
            asset_descriptors_byte                             8 uimsbf
        }                                            N10
    }
}
```

Table_id: This indicates an identification of the MPT table. MPTs in different layers should have different table identifications (table_ids). Eight different values are allocated to MPT table_ids. Among the eight MPT table_ids, a table_id of the complete MPT or layer-0 MPT is smallest when layered MPTs are used. In the remaining MPT table_ids, a smaller value means a lower layer MPT.

Version: This indicates a version of the MPT. A newer version overrides an old version upon receipt.

Length: This indicates a length of the MPT counted at starting bytes from the next field to a last byte of the ITN table. "0" is not used for this field.

MMT_package_id: This indicates a globally inherent identification of the MMT package.

MPT_descriptors_length: This indicates a length of a descriptor syntax loop. This length is counted from the next field to an end of the descriptor syntax loop. Various descriptors may be inserted into the syntax loop.

MPT_descriptors_byte: This indicates 1 byte in the descriptor loop.

Package_type: This indicates a type of the package. Allowed values are shown in Table 20.

TABLE 20

| Value | Meaning |
| --- | --- |
| 0x00 | Unspecified |
| 0x01 | basic Video |
| 0x02 | basic Audio |
| 0x03 | rich media |
| 0x04 | Ebook |
| 0x05 | Application |
| 0x06 | Text |
| 0x07 | HTML |
| 0x08~0xFF | reserved for future use |

Package_name: This indicates a name of the package in multiple languages if possible. A language code is a 3-byte language identification defined in the ISP 639 standard. In lists, a first language is default.

Package_description: A syntax description language code of the package in multiple languages is a 3-byte language identification defined in the ISP 639 standard if possible. In lists, a first language is default.

Audio_languages: This indicates an audio language(s) used in the package. A language code is 3-byte language identification defined in the ISP 639 standard. In lists, a first language is default.

Text_languages: This indicates a text language(s) used in the package. A language code is 3-byte language identification defined in the ISP 639 standard. In lists, a first language is default.

Target_user_profiles: This indicates a profile(s) of users targeting the package.

Required_device_capability_profiles: This indicates a profile(s) of a device capability required for package consumption.

Parental_guidance_flag: When this flag is "1", a receiver should not provide what is decoded, until it is sure from rating information (a delivery method thereof is not specified in the standard so far) that contents about setting by a viewer for child protection are allowed to be displayed. When this flag is "0", the receiver merely provides what is decoded from the package without checking the rating.

Recording_flag: When this flag is "1", a receiver may store this package in an internal storage unit for the further user.

Fast_play_fast: When this flag is "1", a receiver instructs a viewer to perform high speed play of the package.

Clock_reference_flag: When this flag is "0", clock_reference_id is not provided, and an MMT system clock is an NTP clock by default, that is, time base of all assets in the package is the NTP clock. When this flag is "1", a clock_reference_id field is included.

Protection_scheme_id_flag: When this flag is "1", a protection_scheme_id field is included in the next.

Clock_reference_id: This indicates a clock reference identification. This field is default time base of all assets in the package and is used for referencing a clock transmitted by clock_reference_descriptor( ). "0" is not allowed for this field. Two placeholders exist with respect to the clock reference identification in NPT syntax. One (this field) is applied to all assets in the package, but the other is applied only to an asset entry in a syntax loop. When both fields are included in the MPT syntax, the latter has a high priority.

Timescale_flag: When this flag is "1", a timescale field is included in the next.

Timescale: This indicates a time unit for all timestamps used for all assets in this package expressed in a plurality of units per second. A default value is 90,000. There are two placeholders with respect to the timescale field in the MPT syntax. One (this field) is applied to all assets in this package, but the other is applied only to an asset entry in the syntax loop. When both fields are included in the MPT syntax, the latter has a high priority.

Protection_scheme_id: This field indicates a protection scheme used for all assets in the package. There are two placeholders with respect to a protection scheme identification field in MPT syntax. One (this field) placeholder is applied to all assets in the package, but the other placeholder is applied to only an asset entry in a syntax loop. Both fields are included in the MPT syntax, the latter has a high priority. A value of this field is one of DCAS_types specified by D-CAS descriptors in section 7 (3) of the third embodiment.

Protection_scheme_id_flag: When this flag is "1", protection_Scheme_id field is included in the next.

MMT_general_location_info( ) for the CI location: This indicates general location reference information on the MMT defined in 1.1.3. Only location_type=0x0F~0x13 are allowed for a CI location.

Number_of_assets: This indicates a number of assets in the MPT.

Asset_type: This indicates a type of assets. This field is similar to steam type defined in the MPEG-2 PMT, but corresponds to an extension therefrom.

Asset_id: This indicates an asset identification. In CI, asset_id is used to refer to an asset. Asset_id defined in CI is globally inherent. This field is a short alias of a globally inherent asset identification. Aliasing is automatically performed by mapping sequences of assets in asset lists (LoAs) in CI. When CI layering is used, aliasing is performed within a concatenation of all the ordered LoAs from layer-0 to layer-N. In asset information syntax within the MPT, asset_id alias should be incremental.

Asset_clock_reference_flag: When this flag is "1", an asset_clock_reference_id field is included in the next syntax.

Asset_clock_reference_id: This indicates a clock reference identification of the asset. This field is used for referencing a clock transmitted by clock_reference_descriptor( ) as a time base of the asset. When this field is "0", an NTP clock is used for the asset. When this field is not "0", a value of this field is one of values of clock_reference_id provided by clock reference descriptors.

Asset_timescale_flag: When this value is "1", an asset_timescale field is included in the next syntax.

Asset_timescale: This indicates a time unit of all timestamps used for the asset expressed in a plurality of units per second.

Asset_protected_flag: When this flag is "1", this asset is protected.

Asset_protection_scheme_id_flag: When this flag is "1", an asset_protection_scheme_id field is included in the next syntax.

MMT_general_location_info( ) for the asset location: This indicates general location reference information on the MMT defined in Table 6 to Table 8 in section 1 (3) of the third embodiment. Only location_type=0x03, 0x05, and 0x07~0x0D are allowed for the asset location.

Asset_descriptors_length: This indicates a number of bytes counted from the next field to an end of the asset descriptor syntax loop.

Asset_descriptors_byte: This indicates a byte in the asset descriptor.

6. Device Capability Information Table (DCIT) Message.

The DCIT provides device capability information.

When DCITs are transmitted within the ITN message as indicated by reference numeral 530, the DCITs should be capsulated in a structure of a table called the DCIT.

(1) DCIT Message Syntax and Semantic

DCIT message syntax is defined in Table 21, and semantic of syntax elements thereof is provided below Table 21.

TABLE 21

| Syntax | Value | No. of bits | Format |
|---|---|---|---|
| DCIT_message ( ) { | | | |
|    message_id | | 8 | uimsbf |
|    version | | 8 | uimsbf |
|    length | | 16 | uimsbf |
|    extension_fields { | | | |
|      DCIT_transmission_info { | | | |
|        reserved | '1111 | 7 | bslbf |
|        start_time_flag | 111' | 1 | bslbf |
|        if (start_time_flag ==1) { | | | |
|          start_time | | 64 | uimsbf |
|        } | | | |
|        retransmission_period | | 16 | uimsbf |
|      } | | | |
|    } | | | |
|    Payload { | | | |
|      DCIT( ) | | | |
|    } | | | |
| } | | | |

Message id: This indicates a type of the S layer message. A length of this field is 8 bits.

Version: This indicates a version of the S layer message. The MMT client may check whether the received S layer message is new. Particularly, this field is useful when the S layer message is repeatedly transmitted through a broadcasting network. A length of this field is 8 bits.

Length: This indicates a length of the S layer message. A length of this filed is 16 bits. This indicates a length of the MPT message counted at starting bytes from the next field to a last byte of the DCIT message. "0" is not used in this field.

Start_time_flag: When this flag is "1" additional syntax element start_time is used.

Start_time: This indicates a start time in the NPT of DCIT message transmission.

Retransmission_period: This indicates a retransmission time of this DCIT message. A unit of retransmission_period is 10 ms. When layered MPTs are used, retransmission_period of a higher layer MPT is generally longer than retransmission_period of an MPT layer lower than the higher layer MPT.

MMT_package_table( ): This is defined in section 5 (2) of the third embodiment.

DCIT( ): This is defined in section 6 (2) of the third embodiment.

(2) DCIT Syntax and Semantic

DCIT syntax and semantic are defined in Tables 22 to 24.

TABLE 22

| Name | Description | Data Type | Level |
|---|---|---|---|
| DCIT | Device Capability Information Table Contains the following elements: Video Audio DownloadFile Rich Media | | 0 |
| List of Package or Asset | List of Package or Asseclientt that recommend the capabilities in DCIT | | 0 |
| Video | Video codec capability related requirements Contains the following elements: MIMEType, CODEC and Complexity Complexity | | 1 |
| MIMEType | MIME Media type of the video. If the complexities that can be derived from the MIMEType element and the codec parameters below differ from the parameters defined under the 'Complexity' element below, then the parameters defined under the 'Complexity' element SHALL take priority. Contains the following attribute: Codec | | 2 |
| codec | The codec parameters for the associated MIME Media type. If the MIME type definition specifies mandatory parameters, these MUST be included in this string. Optional parameters containing information that can be used to determine as to whether the client can make use of the media SHOULD be included in the string. | | 3 |
| Complexity | The complexity the video decoder has to deal with. It is RECOMMENDED that this element is included if the complexity indicated by the MIME type and codec parameters differs from the actual complexity. Contains the following elements: Bitrate Resolution MinimumBufferSize | | 2 |
| Bitrate | The total bit-rate of the video stream. | | 2 |

TABLE 23

| | | | |
|---|---|---|---|
| | Contains the following attributes: average maximum | | |
| average | The average bit-rate in kbit/s | | 3 |
| maximum | The maximum bit-rate in kbit/s | | 3 |
| Resolution | The resolution of the video. Contains the following attributes: horizontal vertical temporal | | 2 |
| horizontal | The horizontal resolution of the video in pixels. | | 3 |
| vertical | The vertical resolution of the video in pixels. | | 3 |
| temporal | The maximum temporal resolution in frames per second. | | 3 |
| MinimumBufferSize | The minimum decoder buffer size needed to process the video content in kbytes. | | 3 |
| Audio | The audio codec capability. Contains the following elements: MIMEType Complexity | | 1 |

TABLE 23-continued

| | | |
|---|---|---|
| MIMEType | MIME Media type of the audio.<br>If the complexities that can be derived from the MIMEType element and the codec parameters below differ from the parameters defined under the 'Complexity' element below, then the parameters defined under the 'Complexity' element SHALL take priority.<br>Contains the following attribute:<br>codec | 2 |
| codec | The codec parameters for the associated MIME Media type. If the MIME type definition specifies mandatory parameters, these MUST be included in this string. Optional parameters containing information that can be used to determine as to whether the client can make use of the media SHOULD be included in the string. | 3 |
| Complexity | The complexity the audio decoder has to deal with. | 2 |

TABLE 24

| | | |
|---|---|---|
| | It is RECOMMENDED that this element is included if the complexity indicated by the MIME type and codec parameters differs from the actual complexity.<br>Contains the following elements:<br>Bitrate<br>MinimumBufferSize | |
| Bitrate | The total bit-rate of the audio stream.<br>Contains the following attributes:<br>average<br>maximum | 3 |
| average | The average bit-rate in kbit/s | 3 |
| maximum | The maximum bit-rate in kbit/s | 3 |
| MinimumBufferSize | The minimum decoder buffer size needed to process the audio content in kbytes. | 3 |
| DownloadFile | The required capability for the download files.<br>Contains the following elements:<br>MIMEType | 1 |
| MIMEType | Assuming a download service consists of a set of files with different MIME types which together make up the service, the client must support all of these MIME types in order to be able to present the service to the user.<br>Contains the following attribute:<br>codec | 2 |
| codec | The codec parameters for the associated MIME Media type.<br>If the file's MIME type definition specifies mandatory parameters, these MUST be included in this string. Optional parameters containing information that can be used to determine as to whether the client can make use of the file SHOULD be included in the string. | 3 |
| PrivateExt | An element serving as a container for proprietary or application-specific extensions | 1 |
| <proprietary elements> | Proprietary or application-specific elements that are not defined in this specification. These elements may further contain sub-elements or attributes | 1 | language of the asset. The language descriptor included in the asset descriptor syntax loop in the MPT has high priority over the language descriptor included in the MPT descriptor syntax loop in the MPT.

Syntax of language_descriptor( ) is defined in Table 25, and semantic of syntax elements thereof is provided below Table 25.

TABLE 25

| Syntax | Value | No. of bits | Format |
|---|---|---|---|
| language_descriptor( ) {<br>  descriptor_tag<br>  descriptor_length<br>  ISO_639_language_code<br>} | | 16<br>16<br>8*3 | uimsbf<br>uimsbf<br>uimsbf |

7. Descriptors

Descriptors related to S layer tables are defined herein.

(1) Language Descriptor

A language descriptor is used to specify a media asset such as audio data, a commentary channel, a subtitle or the like. The language descriptor may be included in an MPT descriptor syntax loop or an asset descriptor syntax loop in MPT. When the language descriptor is included in the MPT descriptor syntax loop, this specifies languages of all assets in the package. When the language descriptor is included in the asset descriptor syntax loop in the MPT, this specifies a Descriptor_tag: This indicates a tag value representing a descriptor type.

Descriptor_length: This indicates a byte unit length counted from the next byte to a last byte of the descriptor.

ISO_639_language_code: This indicates a 3-byte ISO 639 language identification.

(2) Clock Reference Descriptor

The clock reference descriptor is used for specifying a relation between an MMT system clock and an encoder clock for media synchronization. A Universal Time Coordinated (UTC) in a Network Time Protocol (NTP) format is used as an MMT system clock time. The MMT allows different clocks to be used for different assets. A clock used by an asset encoder is specified by clock_reference_id.

Clock_reference_descriptors: This should be periodically transmitted in a clock reference message based on a short cycle, for example, 100 ms.

Syntax of clock_reference_descriptors( ) is defined in Table 26, and semantic of syntax elements thereof is provided below Table 26.

TABLE 26

| Syntax | Value | No. of bits | Format |
|---|---|---|---|
| clock_reference_descriptor( ) { | | | |
|   descriptor_tag | | 16 | uimsbf |
|   descriptor_length | | 16 | uimsbf |
|   clock_reference_id | | 8 | uimsbf |
|   encoder_clock_sample | | 42 | uimsbf |
|   MMT_system_clock_time | | 64 | uimsbf |
| } | | | |

Descriptor_tag: This indicates a tag value representing a descriptor type.

Descriptor_length: This indicates a byte unit length counted from the next byte of this field to a last byte of the descriptor.

Clock_reference_id: This indicates an identification of a media clock used by an asset encoder.

Encoder_clock_sample: This indicates a sampled value of the media clock used by the asset encoder corresponding to MMT_system_clock_time below.

MMT_system_clock_time: This indicates a UTC time value in an NTP format corresponding to previous encoder_clock_sample.

(3) Security Descriptor

The security descriptor is used for specifying a security system which can be used for protecting an MMT asset or a package.

Security_descriptor should be periodically transmitted in a security message or an ITN message.

Syntax of security_descriptor( ) is defined in Table 27, and semantic of syntax elements thereof is provided below Table 27.

TABLE 27

| Syntax | Value | No. of bits | Format |
|---|---|---|---|
| security_descriptor( ) { | | | |
|   descriptor_tag | | 16 | uimsbf |
|   descriptor_length | | 16 | uimsbf |
|   Security_type | | 8 | uimsbf |
|   If (security_type = access control){ | | | |
|     Solution | | | |
|     Access_control_server_address { | | | |
|     } | | | |
|   } | | | |
|   Else if (security_type = DRM){ | | | |
|     Solution | | | |
|     DRM_server_address { | | | |
|     } | | | |
|   } | | | |
|   Else if(security_type = DCAS){ | | | |
|     DCAS_server_address { | | | |
|     } | | | |
|   } | | | |

TABLE 27-continued

| Syntax | Value | No. of bits | Format |
|---|---|---|---|
|   Else if(security_type = DDRM){ | | | |
|     DDRM_server_address { | | | |
|     } | | | |
|   } | | | |
| } | | | |

Descriptor_tag: This indicates a tag value representing a descriptor type.

Descriptor_length: This indicates a byte unit length counted from the next byte of this field to a last byte of the descriptor.

Security_type: This indicates a type of a security solution. This refers to access control, DRM, and a solution of downloadable CAS or downloadable DRM.

Solution: This indicates which security solution is used for access control, DRM, DCAS, or DDRM.

Access_control_server_address: This indicates an address of an access control security solution server by which a client is authenticated and applied.

DRM_server_address: This indicates an address of a DRM solution server by which a client is authenticated and permitted.

DCAS_server_address: This indicates an address of a DCAS server from which a client can download DCAS SW after authentication and permission.

DDRM_server_address: This indicates an address of a DDRM server from which a client can download DDRM SW after authentication and permission.

Figure 8:
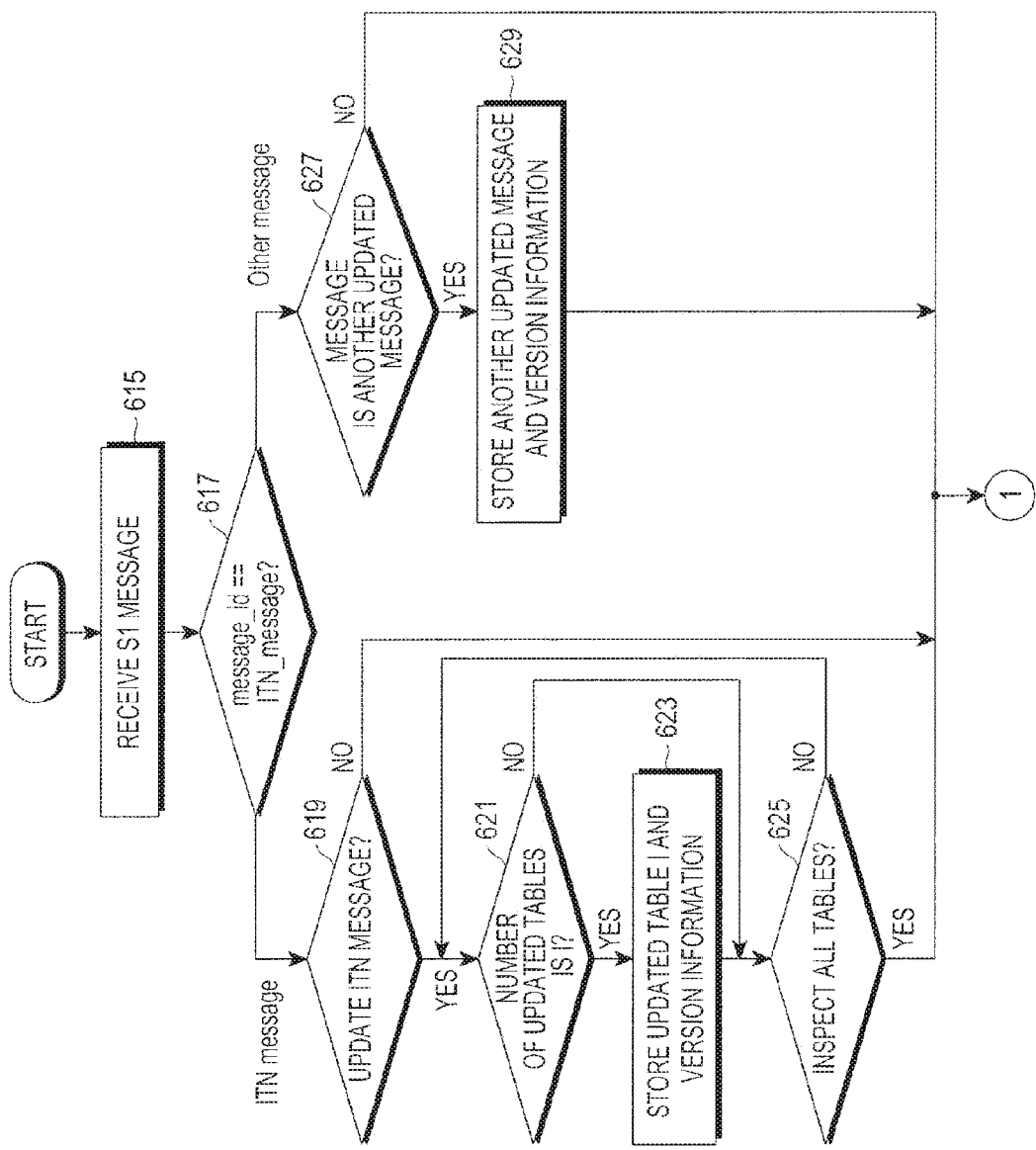
FIGS. 8 and 9 illustrate an operation in which a receiver receives multimedia according to a third embodiment of the present disclosure.
Figure 9:
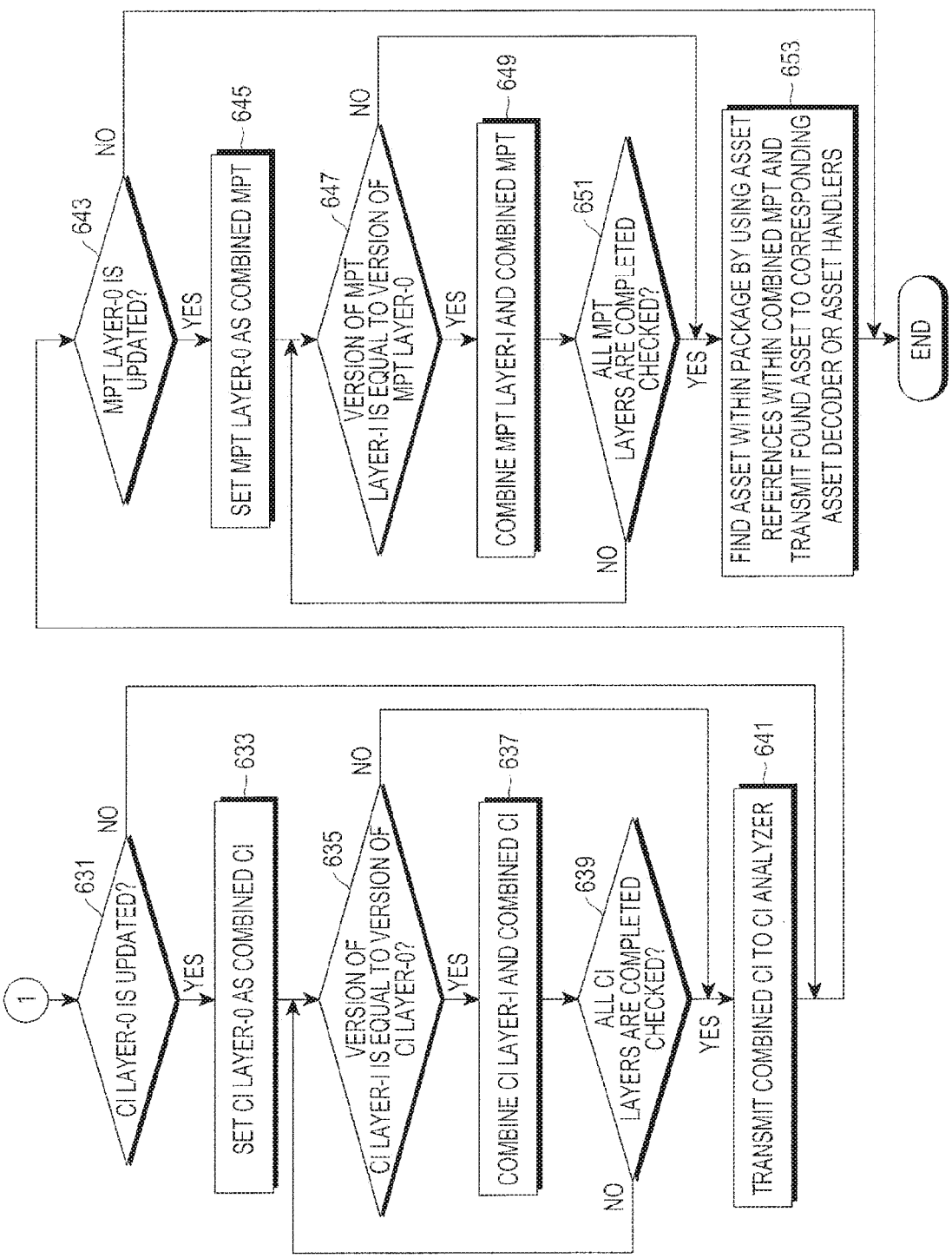

FIGS. 8 and 9 are flowcharts illustrating a process in which a receiver receives multimedia according to an embodiment of the present disclosure.

Referring to FIG. 8, the receiver first finds an S1 message transmitted through a current channel in operation 615. The S1 message corresponds to a message for managing all function required for consuming MMT assets and MMT items.

The receiver determines whether the found S1 message is an ITN message based on a message ID in operation 617. When the message is another message which is not the ITN message, it is determined whether another message is updated in operation 627. When the message is another updated message, the receiver stores the another updated message and version information of the updated another message in a memory of the receiver in operation 629.

Meanwhile, based on a result of the determination in operation 617, when the message is the ITN message, the receiver determines whether the ITN message included in the found S1 message is updated based on the version information in operation 619. When the ITN message is updated, the receiver determines whether one or more tables (i tables) within the ITN message are updated in operation 621. When the tables are updated, the receiver stores one or more updated tables and stores version information thereof in a memory of the receiver in operation 623.

Thereafter, the receiver searches all tables in operation 625.

As a result of the search, the receiver determines whether CI layer 0 is updated in operation 631 of FIG. 9.

When CI layer 0 is updated, the receiver sets CI layer 0 as combined CI in operation 633.

The receiver determines whether a version of CI layer i is the same as a version of CI layer 0 in operation 635.

When the versions are the same, the receiver combines CI layer i and the combined CI in operation 637. The receiver determines whether all CI layers are completely searched in operation 639. When all searches are completed, the receiver transmits the combined CI to a CI analyzer in operation 641.

Meanwhile, the receiver determines whether MPT layer 0 is updated in operation 643.

When MPT layer 0 is updated, the receiver sets MPT layer 0 as a combined MPT in operation 645.

The receiver determines whether a version of MPT layer i is the same as a version of MPT layer 0 in operation 647.

When the versions are the same, the receiver combines MPT layer i and the combined MPT in operation 649. The receiver determines whether all MPT layers are completely searched in operation 651. When all searches are completed, the receiver finds an asset within the package by using asset references within the combined MPT and transmits the found asset to a corresponding asset decoder or asset handlers in operation 653.

Figure 10:
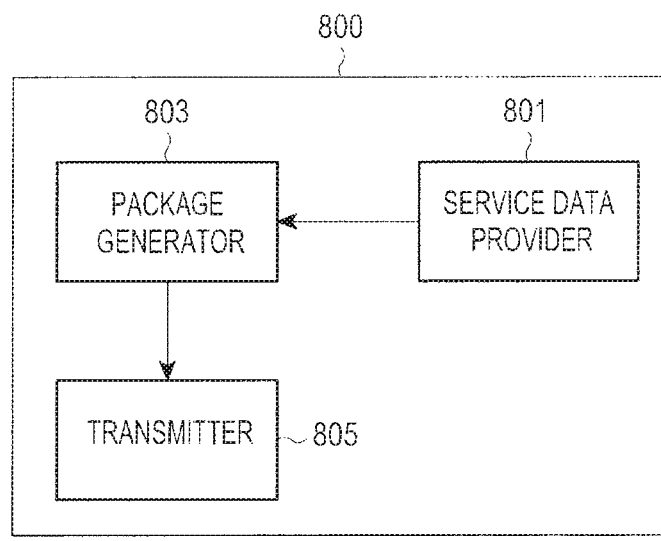
FIG. 10 is a block diagram of a transmission apparatus according to the third embodiment of the present disclosure.

FIG. 10 is a block diagram of a transmission apparatus according to an embodiment of the present disclosure.

A service providing server which is an example of the transmission apparatus 800 includes a service data provider 801, a package generator 803, and a transmitter 805. Although not illustrated, it is a matter of course that the transmission apparatus 800 includes a controller that controls components of the transmission apparatus 800 to perform operations according to the present disclosure.

The service data provider 801 has all service sources.

The package generator 803 generates a package by using the table described with reference to FIGS. 5 and 7.

The transmitter 805 transmits the generated package to a terminal.

Further, the transmitter 805 may transmit the generated package to the terminal by using two networks including a broadcast network or a broadband network having different physical characteristics.

Figure 11:
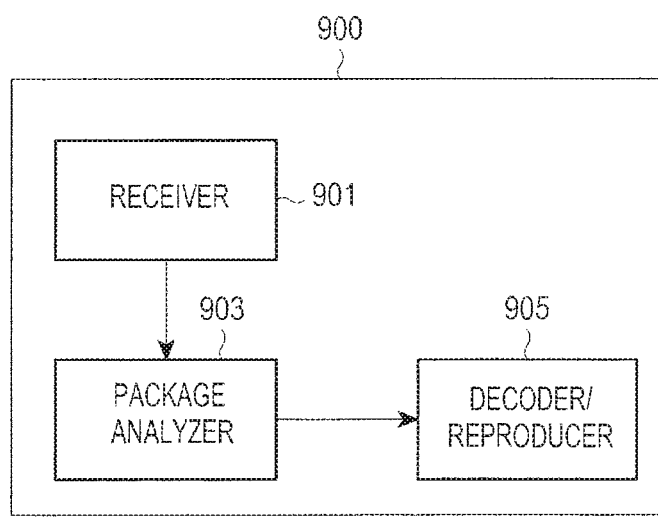
FIG. 11 is a block diagram of a reception apparatus according to the third embodiment of the present disclosure.

FIG. 11 is a block diagram illustrating a reception apparatus according to an embodiment of the present disclosure.

The reception apparatus 900 may be, for example, a terminal, but the present disclosure is not limited thereto.

The reception apparatus 900 includes a receiver 901, a package analyzer 903, and a decoder/reproducer 905. Although not illustrated, it is a matter of course that the reception apparatus 900 includes a controller that controls components of the reception apparatus 900 to perform operations according to the present disclosure.

The receiver 901 receives a generated package by using the table described with reference to FIGS. 5 and 7 according to an embodiment of the present disclosure.

The package analyzer 903 analyzes components of the received package.

The decoder/reproducer 905 decodes and reproduces contents based on the analyzed components of the package.

Fourth Embodiment

The fourth embodiment of the present disclosure suggests MPEG media transport signaling messages and tables including all pieces of information on reception and consumption of a single package by a client. Aggregation of a plurality of packages and signaling methods related to a formation of medium services are beyond the scope of this document.

A specific MPEG medium transport signaling message called a table list (LOT) message has table list including location, version, and length information of all other MPEG medium transport signaling tables for the MPEG medium transport package.

The MPEG medium transport signaling message may include one or more MPEG medium transport signaling tables. For example, in order to reduce a program acquisition time or a channel change delay in a broadcasting scenario, a table list message may include not only one table list required when the receiver shows main video and audio data of one package but also other MPEG medium transport signaling tables.

In this document, five types of messages below are provided.

Table list (LOT) message: This message has a table list table. The table list table includes information on all other signaling tables. One table list may include one or more MPEG medium transport signaling tables in addition to one table list.

MPEG medium transport Composition Information (MCI) message: This message has an MPEG medium transport composition information table. One MPEG medium transport composition information table has one of complete composition information and layered composition information which is a part of the complete composition information. In the layered composition information, each layer MPEG medium transport composition information table is transmitted in a separate message.

MPEG medium transport Package Table (MPT) message: This message has an MPEG medium transport package table. A complete MPEG medium transport package table and a layer-0 MPEG medium transport package table correspond to the MPEG medium transport package. The complete MPEG transport package table has lists of MPEG medium transport assets for one package, and one layer-0 MPEG medium transport package table has lists of several MPEG medium transport assets for one package. Further, all pieces of information related to one package are included in an MPEG medium transport package table message. All pieces of information related to one package correspond to a package policy such as a parental rating, an audio language, a text language, a target user profile, a required device capability, record permission, and permission for fast reproduction.

Clock Relation Information (CRI) message: This message has clock relation information to be used for mapping between a Network Time Protocol (NTP) clock and an MPEG-2 clock.

Device Capability Information (DCI) message: This message has a device capability information table. The device capability information indicates device capability required and/or recommended for consuming a medium transmitted by MPEG medium transport.

Some MPEG medium transport signaling tables include descriptors. These tables may include as many descriptors of the same type as needed.

In this document, the following descriptor is defined.

Clock Relation Information (CRI) descriptor: This indicates one descriptor per mapping of a pair of clocks.

Figure 12:
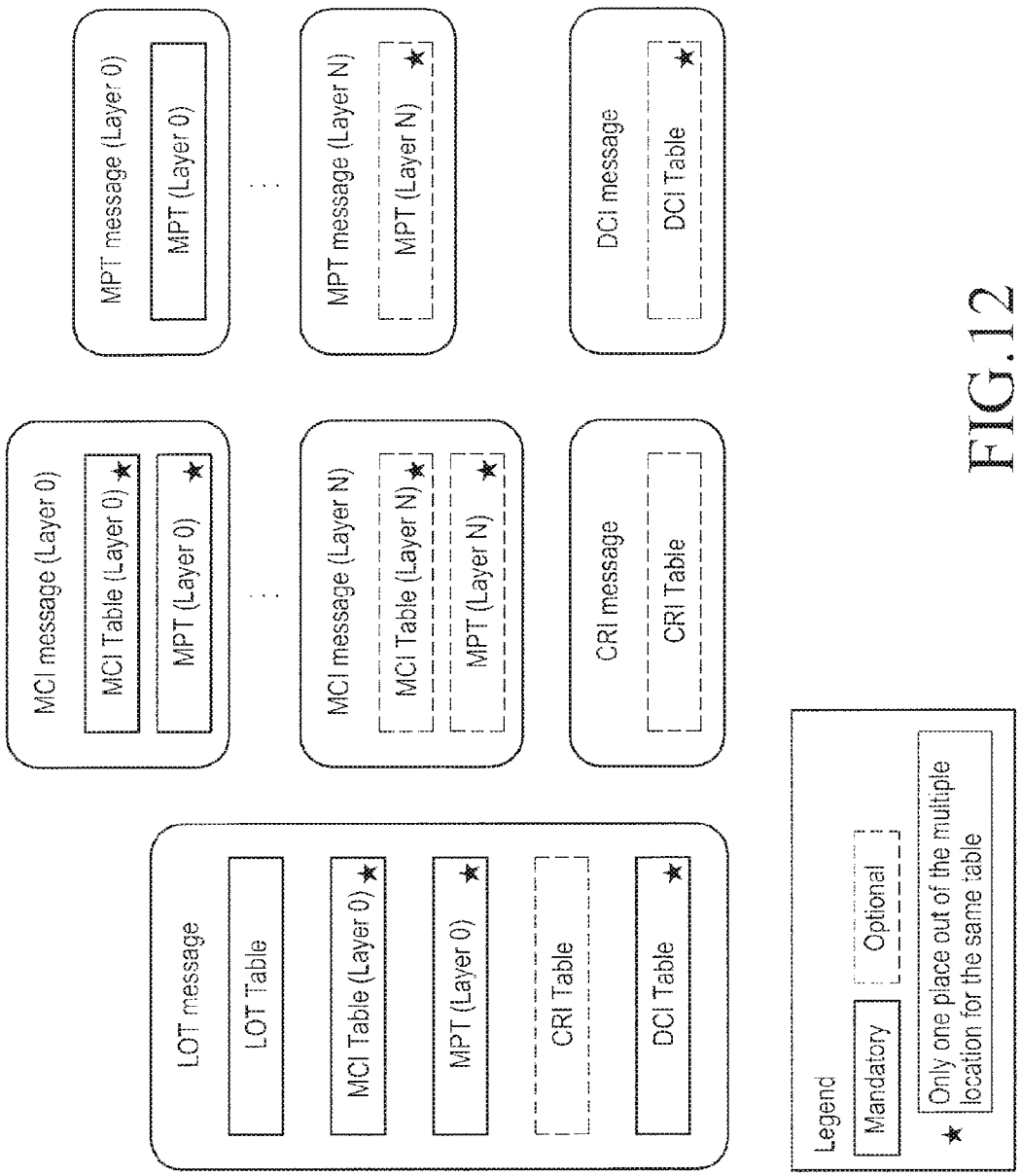
FIG. 12 illustrates a structure of an MMT signaling message and a table according to a fourth embodiment of the present disclosure.

FIG. 12 illustrates structures of MPEG medium transport signaling messages and tables according to an embodiment of the present disclosure.

FIG. 12 is similar to FIG. 7 only differing in tables and terms.

1. Syntax and Semantic of MPEG Medium Signaling Messages for Medium Consumption.

(1) Table List (LOT) Message

One table list message has a table list table including information on all other signaling tables for one package. A table list message may have an MCI table and an MPT in any environment for rapid consumption of an MMT package.

It is highly recommended that one client read and analyze a table list message before reading other predetermined messages for efficient acquisition of all required signaling information.

Particularly, in a broadcasting environment, one table list message may be transmitted based on a very short period (for example, 500 ms) in order to guarantee short power-up delay or short zapping time.

(2) Table List Message Syntax and Semantic

Table list message syntax is defined in Table 28, and semantic of syntax elements of the table list message is provided below Table 28. A method of defining the syntax is based on a method of the MPEG-2 system standard (ISO/IEC 13818-1), but a method of defining the semantic may be expressed by an eXtensible Markup Language (XML). A loop count which is not shown in a "value" column may be inferred from a length of the table. The same rule is applied to other tables in this document.

TABLE 28

| Syntax | Value | No. of bits | Format |
|---|---|---|---|
| LOT_message ( ) { | | | |
|     message_id | | 16 | uimsbf |
|     version | | 8 | uimsbf |
|     length | | 16 | uimsbf |
|     extension_fields { | | | |
|         number_of_tables | N1 | 8 | uimsbf |
|         for (i=0; i<N1; i++) { | | | |
|             table_id | | 8 | uimsbf |
|             table_version | | 8 | uimsbf |
|             table_length | | 16 | uimsbf |
|         } | | | |
|     } | | | |
| } | | | |

TABLE 28-continued

| Syntax | Value | No. of bits | Format |
|---|---|---|---|
|     Payload { | | | |
|         for (i=0; i<N1; i++) { | | | |
|             table( ) | | | |
|         } | | | |
|     } | | | |
| } | | | |

Message_id: This indicates a type of the MMT signaling message. A length of this field is 16 bits.

Version: This indicates a version of the MMT signaling messages. An MMT client may identify whether the received message is new. Particularly, this field is useful when the messages are repeatedly transmitted through a broadcasting network. A length of this field is 8 bits.

Length: This indicates a length of the MMT signaling message. A length of this field is 16 bits. This indicates a length of a table list message calculated in bytes from the next field of the table list message to a last byte. "0" is not used for this field.

Number_of_tables: This indicates a number of tables included in the table list message.

Table_id: This indicates a table identification of the table included in the table list message. This corresponds to a copy of the table_id field in the table included in payload of the table list message.

Table_version: This indicates a version of the table included in the table list message. This corresponds to a copy of the version field in the table included in payload of the table list message.

Table_length: This indicates a length of the table included in the table list message. This corresponds to a copy of the length field in the table included in payload of the table list message. An actual length of the table is table_length+5.

Table( ): This indicates an example of the MMT signaling table. The tables in the payload have the same sequences as those of table_ids. One table list table corresponds to an example of table( ).

(3) Table List Table Syntax and Semantic

Table list table syntax is defined in Table 29, and semantic of syntax elements of the table list table is defined below Table 29.

TABLE 29

| Syntax | Value | No. of bits | Format |
|---|---|---|---|
| LOT_table ( ) { | | | |
|     table_id | | 8 | uimsbf |
|     version | | 8 | uimsbf |
|     length | | 16 | uimsbf |
|     information_table_info { | | | |
|         number_of_tables | | 8 | uimsbf |
|         for (i=0; i<N1; i++) { | N1 | | |
|             information_table_id | | 8 | uimsbf |
|             information_table_version | | 8 | uimsbf |
|             location { | | | |
|                 MMT_general_location_info( ) | | | |
|             } | | | |
|             reserved | '1111 11' | 6 | bslbf |
|             second_location_flag | | 1 | bslbf |
|             table_filter_code_flag | | 1 | bslbf |
|             if (second_location_flag == 1) { | | | |
|                 second_location { | | | |
|                     MMT_general_location_info( ) | | | |
|                 } | | | |
|             } | | | |
|             if (table_filter_code_flag == 1) { | | | |
|                 table_filter_codes { | | | |
|                     number_of_languages_for_table_filter_codes | | 8 | uimsbf |

TABLE 29-continued

| Syntax | Value | No. of bits | Format |
|---|---|---|---|
|       for (j=0; j<N2; j++) { | N2 | | |
|         table_filter_code_language | | 24 | uimsbf |
|         number_of_table_filter_codes | | 8 | |
|         for (k=0, k<N3; k++) { | N3 | | |
|           table_fileter_code_length | | 8 | uimsbf |
|           for (m=0; m<N4; m++) { | N4 | | |
|             table_fileter_code_byte | | 8 | uimsbf |
|           } | | | |
|         } | | | |
|       } | | | |
|     } | | | |
|   } | | | |
| } | | | |
| reserved | | 7 | bslbf |
| private_extension_flag | '1111 111' | 1 | bslbf |
| if (private_extension_flag == 1) | | | |
|   private_extension { | | | |
|   } | | | |
| } | | | |
| } | | | |

Table_id: This indicates an identification of the table list table.

Version: This indicates a version of the table list table. A newer version has a high priority over an older version upon receipt.

Length: This indicates a length of the table list table calculated in bytes from the next field of the table list table to a last byte.

Number_of_tables: This indicates a number of information tables having information provided in this table list table.

Information_table_id: This indicates an ID of information table having information provided in this table list table. Table_id of the table list table is not shown herein.

Information_table_version: This indicates a version of information table having information provided in this table list table.

MMT_general_location_info( ): This provides a location of the information table having information provided in this table list table. MMT_general_location_info( ) is defined in section 1 (3) of the third embodiment.

Annotation: An actual location is determined by a syntax element of location_type within MMT_general_location_info( ).

Second_location_flag: When this flag is set as "1", one client provides one alternative address having the information table.

MMT_general_location_info( ) for second_location: One client provides information on one alternative address having the information table.

Annotation: only location_type=0x07~0x0 are used in MMT_general_location_info( ).

Table_filter_code_flag: When this flag is set, one or more table filter codes are provided. One table filter code designates references for aggregation of tables. When a plurality of references for aggregation simultaneously exist, all aggregation references are applied to the information table.

Table_filter_code_language: This indicates a language used for table_filter_code. The language code is a 3-byte language identification defined in the ISO 639 standard.

Number_of_table_filter_codes: This provides information on the number of table filter codes for the information table.

Table_filter_code_length: This indicates a byte length of table_filter_code.

Table_filter_code_byte: This indicates one byte in table_filter_code.

Private_extension_flag: When this flag is "1", a private extension exists.

Private_extension( ): This indicates one syntax element set serving as a container for proprietary or application-specific extensions.

2. MCI Message

The MCI message delivers complete CI. Alternatively, when layered CI is used, the MCI message delivers a part of the complete CI. MCI messages use an MCI table for capsulation of CI.

When layered CI is used, the MCI is divided into a plurality of pieces of layered MCI tables. MCI tables in different layers may have different table identifications (table_ids). Values of table_ids for the layered MCI tables are allocated to adjacent spaces in an ascending order equally to the layer numbers. Layer-0 MCI table is a basic MCI table. Other CI layers have layer numbers from 1 to 14. In general, a highest MCI table_id is allocated to the MCI table which delivers complete CI.

MCI messages each of which has one CI layer may have different transmission periods and may include the MPEG medium transport Package Table (MPT) associated with the CI included in the MCI message. For example, one layer-N MCI message may include the layer-N MPT.

Further, when the layered CI is used in a broadcasting environment, it is highly recommended to have one layer-0 CI in the table list message in order to reduce a time spent to acquire package consumption information.

(1) MCI Message Syntax and Semantic

MCI message syntax is defined in Table 30, and semantic of syntax elements of the MCI message is provided below Table 30.

TABLE 30

| Syntax | Value | No. of bits | Format |
|---|---|---|---|
| MCI_message ( ) { | | | |
|   message_id | | 16 | uimsbf |
|   version | | 8 | uimsbf |

TABLE 30-continued

| Syntax | Value | No. of bits | Format |
|---|---|---|---|
| length | N1 | 16 | uimsbf |
| extension_fields { | | | |
|   reserved | '111 1111' | | |
|   associated_MPT_flag | | 1 | bslbf |
| } | | | |
| Payload { | | | |
|   MCI_table( ) | | | |
|   if (associaled_MPT_flag) { | | | |
|     MPT_table( ) | | | |
|   } | | | |
| } | | | |
| } | | | |

Message_id: This indicates an ID of the MCI message. A length of this field is 16 bits.

Version: This indicates a version of the MCI message. A length of this field is 8 bits.

Length: This indicates a length of the MCI message calculated in bytes from the next field of the MCI message to a last byte. "0" is not used in this field. A length of this field is 16 bits.

Associated_MPT_flag: When this flag is set as "1", this indicates that the MCI message has an MPT associated with CI included in the MCI message. Simultaneous delivery of the MCI table and the MPT for the same layer in one MCI message helps in reducing a time spent when one client acquires MMT package consumption signaling.

MCI_table( ): This indicates an MCI table defined in section 2 (2) of the fourth embodiment.

MPT_table( ): This indicates an MPT defined in section 3 (2) of the fourth embodiment.

(2) MCI Table Syntax and Semantic

MCI table syntax is defined in Table 31, and semantic of syntax elements of the MCI table is provided below Table 31.

TABLE 31

| Syntax | Value | No. of bits | Format |
|---|---|---|---|
| MCI_table ( ) { | | | |
|   table_id | | 8 | uimsbf |
|   version | | 8 | uimsbf |
|   length | N1 | 16 | uimsbf |
|   reserved | '111 1111' | 7 | bslbf |
|   CI_mode | | 1 | bslbf |
|   for (i=0; i<N1−1; i++) { | | | |
|     CI_byte | | 8 | uimsbf |
|   } | | | |
| } | | | |

Table_id: This indicates an identification of the MCI table. Layers of complete CI and layered CI may have different table identifications. Accordingly, CI layer numbers may be implicitly expressed by this field. Since values of table_ids are adjacently allocated, the CI layer numbers may be inferred from this field (that is, the CI layer number is generated by subtracting table_id of the basic MCI_table from this field). Number 0 indicates basic CI and numbers 1 to 14 indicate enhancement-layer CI. Since number 15 indicates complete CI, this has a special meaning.

Version: This indicates a version of the MCI table. When table_id indicates complete MCI, when layer-0 MCI has the same version value as that of this field (CI_mode is "1"), or when all pieces of lower layer MCI are have the same version value as that of this field (CI_mode is "0"), a newer version overrides an older version upon receipt. When the layer-0 MCI_table has a newer version, all pieces of enhancement-layer CI pre-stored in one client are considered as being no longer useful. When a CI layer number is not "0" and CI_mode is "1", the content of the MCI table having a version different from the version of layer-0 CI stored in one client is ignored. Further, when the CI layer number is not "0" and CI_mode is "0", the content of the MCI table having a version different from the version of pieces of lower layer CI stored in one client is ignored. The version increases by modular-256 per version change.

Length: This indicates a length of the MCI table calculated from the next field of the MCI table to a last byte. "0" is not used in this field.

CI_mode: This indicates a mode of hierarchical CI processing. "0" means "sequential_order_processing_mode". "1" means "order_irrelevant_processing_mode". When a layer number of the CI is not "0" in "sequential_order_processing_mode", one client may receive all pieces of lower CI having the same version as that of the CI before processing the CI. In other words, when one client does not have layer-2 CI having the same version, one client cannot process layer-3 CI. That is, when a layer number of the CI is not "0" in "order_irrelevant_processing_mode", just after receiving one CI, one client should process the CI as long as the layer-0 CI stored in one client.

CI_byte: This indicates one byte in the CI.

3. MPT Message

The MMT signaling message has the MPT. When hierarchical delivery of one package is used, one MPT may be divided into a plurality of hierarchical MPTs. The hierarchical MPTs may be delivered by different MPT messages.

The MPT provides information for a single package. The hierarchical delivery of one package having hierarchical CI may be divided into a plurality of hierarchical MPTs. A layer-0 MPT is a basic MPT. MPTs in different layers may have different table identifications (table_ids). Eight adjacently different values are allocated to MPT table_ids and thus the MPT also has fifteen layers of the MPT having one table_id (having a largest number among sixteen numbers) allocated for the complete MPT. A smaller MPT table_id means an MPT layer closer to the basic MPT.

One MPT may be included in a table list message having other tables for an efficient operation for signaling acquisition.

In a broadcasting scenario, when the hierarchical MPT is used within the table list message in order to reduce a package acquisition time, it is highly recommended to have a complete MPT or a layer-0 MPT.

(1) MCI Table Syntax and Semantic

MPT message syntax is defined in Table 32 and semantic of syntax elements of the MPT message is provided below Table 32. One MPT message has only one complete MPT or one layer-N MPT.

TABLE 32

| Syntax | Value | No. of bits | Format |
|---|---|---|---|
| MPT_messagee ( ) { | | | |
|   message_id | | 16 | uimsbf |
|   version | | 8 | uimsbf |
|   length | | 16 | uimsbf |
|   extension_fields { | | | |
|   } | | | |
|   Payload { | | | |
|     MPT( ) | | | |
|   } | | | |
| } | | | |

Message_id: This indicates an ID of the MPT table. A length of this field is 16 bits.

Version: This indicates a version of the MPT message. An MMT client may identify whether the received message is new.

Length: This indicates a length of the MPT message. A length of this field is 16 bits. The Length indicates a length of the MPT message calculated from the next field of the MPT message to a last byte. "0" is not used in this field.

MPT( ): This indicates an MPT defined in section 3 (2) of the fourth embodiment.

(2) MPT Syntax and Semantic

MPT( ) syntax is defined in Table 33, and semantic of syntax elements of the MPT is provided below Table 33.

MPT. Number 0 indicates a basic MPT and numbers 1 to 14 indicate enhancement-layer MPTs. Since number 15 indicates one complete MPT, number 15 has one special meaning.

Version: This indicates a version of the MPT. When MPT layering is used, this field indicates a version of the layer-N MPT. A newer version of one complete or layer-0 MPT overrides an old version upon receipt. When the layer-0 MPT has a newer version, all pieces of enhancement-layer MPTs pre-stored in one client are considered as being no longer useful. The newer version of the layer-N(N is one of 1 to 14) MPT overrides the old version only when the newer version is the same as a version of the current layer-0 MPT. Otherwise, the received MPT is ignored.

TABLE 33

| Syntax | Value | No. of bits | Format |
|---|---|---|---|
| MPT( ) { | | | |
|   table_id | | 8 | uimsbf |
|   version | | 8 | uimsbf |
|   length | | 16 | uimsbf |
|   If (table_id == LAYER_0_MPT_TABLE_ID) { | | | |
|     MMT_package_id { | | | |
|       MMT_package_id_length | N1 | 8 | uimsbf |
|       for (i=0; i<N1; i++) { | | | |
|         MMT_package_id_byte | | 8 | uimsbf |
|       } | | | |
|     } | | | |
|   } | | | |
|   MPT_descriptors { | | | |
|     MPT_descriptors_length | N2 | 16 | uimsbf |
|     for (i=0; i<N2; i++) { | | | |
|       MPT_descriptors_byte | | 8 | uimsbf |
|     } | | | |
|   } | | | |
|   number_of_assets | N3 | 8 | uimsbf |
|   for (i=0; i<N3; i++) { | | | |
|     asset_id { | | | |
|       asset_id_length | N4 | 8 | uimsbf |
|       for (j=0; j<N4; j++) { | | | |
|         asset_id_byte | | 8 | uimsbf |
|       } | | | |
|     } | | | |
|     reserved | '1111 111' | 7 | bslbf |
|     asset_clock_relation_flag | | 1 | bslbf |
|     if (asset_clock_relation_flag == 1) { | | | |
|       asset_clock_relation_id | | 8 | uimsbf |
|       reserved | | 7 | bslbf |
|       asset_timescale_flag | '1111 111' | 1 | bslbf |
|       if (asset_time_scale_flag == 1) { | | | |
|         asset_timescale | | 32 | uimsbf |
|       } | | | |
|     } | | | |
|     asset_location { | | | |
|       MMT_general_location_info( ) | | | |
|     } | | | |
|     asset_descriptors { | | | |
|       asset_descriptors_length | N5 | 16 | uimsbf |
|       for (j=0; j<N5; j++) { | | | |
|         asset_descriptors_byte | | 8 | uimsbf |
|       } | | | |
|     } | | | |
|   } | | | |
| } | | | |

Table_id: This indicates an ID of the MPT. One complete MPT and hierarchical MPTs may use different table identifications. Accordingly, MPT layer numbers are implicitly expressed by this field. Since values of table_ids are adjacently allocated, the MPT layer numbers may be inferred from this field (that is, the MPT layer number is generated by subtracting table_id of the basic MPT from this field). The MPT layer number provides a layer number of this Length: This indicates a length of the MPT calculated in bytes from the next field of the MPT to a last byte. "0" is not used in this field.

MMT_package_id: This indicates a globally inherent identification of the MMT package.

MMT_package_id_length: This indicates a byte length of MMT_package_id strings except for a null character.

MMT_package_id_byte: This indicates one byte in the MMT_package_id strings. The null character is not included in the strings.

MPT_descriptors: This provides descriptors for the MPT.

MPT_descriptors_length: This indicates a length of a descriptor syntax loop. The length is calculated from the next field of the descriptor syntax loop to an end. A plurality of descriptors may be inserted into this syntax loop. For example, additional_package_information_URL descriptor which provides a package information webpage address (URL) for this package may be inserted herein.

MMT_descriptors_byte: This indicates one byte in the descriptor loop.

Number_of_assets: This provides a number of assets having information provided by this MPT.

Asset_id: This provides an asset identification. One asset_id corresponds to one ASCII string having no null character, such as one of ID attributes of AI elements in the CI.

Asset_id_length: This provides a byte length of asset_id.

Asset_id_byte: This indicates one byte in asset_id.

Asset_clock_relation_flag: This indicates whether one asset uses a Network Time Protocol (NTP) clock or another clock system as a clock reference. When this flag is "1", the asset_clock_relation_id field is included in the next syntax. When this field is "0", the NTP clock is used for the assets.

Asset_clock_relation_id: This provides a clock relation identification for the assets. This field is used to refer to the clock relation delivered by one CRI_descriptor( ) for the assets. A value of this field is one of values of clock_relation_id provided by the CRI descriptors.

Asset_timescale_flag: This indicates whether "asset_timescale" information is provided. When this field is "1", the asset_timescale field is included in the next syntax.

Asset_timescale: This provides information of a time unit for all timestamps used for the assets, which is expressed by a unit number per second.

MMT_general_location_info( ) for the asset location: This provides location information of MPT assets. The general location reference information for the MMT defined in the section 7 of the fourth embodiment is used. It should be noted that only location_type=0x00~0x06 are allowed for one asset location.

Asset_descriptors_length: This indicates a number of bytes calculated from the next field of the asset descriptor syntax loop to the end.

Asset_descriptors_byte: This indicates one byte of asset descriptors.

4. CRI Message

A CRI table defined in the section 4 (2) of the fourth embodiment is delivered within a clock relation information message and/or a table list message.

When one or more MPEG-2 basic streams (ESs) are extracted from MPEG-2 transport streams (TSs) as MMT assets, one clock relation information message is used. In order to achieve synchronization between normal MMT assets using NTP timestamps and one MPEG-2 basic stream using an MPEG-2 expression timestamp (PTS), sample values of clocks acquired at the same times are periodically delivered, and thus it is required to inform one client of a relation between the NTP clock and the MPEG-2 system time clock (STC). A clock relation information descriptor defined in section 6 of the fourth embodiment provides a relation between the NTP clock and one MPEG-2 STC. When MPEG-2 basic streams are extracted from MPEG-2 transport streams having different STCs, one or more pieces of clock relation information are provided to one client. The clock relation information descriptors are capsulated by the clock relation information table defined in section 6 of the fourth embodiment and transmitted through the clock relation information message defined in section 6 of the fourth embodiment.

(1) CRI Message Syntax and Semantic

The CRI message syntax is defined in Table 34, and semantic of syntax elements of the CRI message is provided below Table 34.

TABLE 34

| Syntax | Value | No. of bits | Format |
| --- | --- | --- | --- |
| CRI_message ( ) { | | | |
|   message_id | | 16 | uimsbf |
|   version | | 8 | uimsbf |
|   length | | 16 | uimsbf |
|   extension_fields { | | | |
|   } | | | |
|   Payload { | | | |
|     CRI_table( ) | | | |
|   } | | | |
| } | | | |

Message_id: This indicates a type of the CRI message. A length of this field is 16 bits.

Version: This indicates a version of the CRI message. The MMT client may identify whether the received message is new. A length of this field is 8 bits.

Length: This indicates a length of the CRI message calculated by bytes from the next field of the CRI message to a last byte. "0" is not used in this field. A length of this field is 16 bits.

CRI_table( ): one CRI table defined in section 4 (2) of the fourth embodiment.

(2) CRI Table Syntax and Semantic

The CRI table syntax is defined in Table 35, and semantic of syntax elements of the CRI table is provided below Table 35.

One CRI table may include a plurality of CRI descriptors.

TABLE 35

| Syntax | Value | No. of bits | Format |
| --- | --- | --- | --- |
| CRI_table ( ) { | | | |
|   table_id | | 8 | uimsbf |
|   version | | 8 | uimsbf |
|   length | | 16 | uimsbf |
|   for (i=0; i<N1; i++) { | | | |
|     CRI_descriptor( ) | | | |
|   } | | | |
| } | | | |

Table_id: This indicates a table identification of the CRI table.

Version: This indicates a version of the CRI table. A newer version overrides an older version upon receipt.

Length: This indicates a length of the CRI table calculated by bytes from the next field of the CRI table to a last type. "0" is not used in this field.

CRI_descriptor( ): This indicates one CRI descriptor. This is defined in the section 4 (1) of the fourth embodiment.

5. DCI Message

The DCI message delivers a DCI table which provides DCI used (or recommended) for MPT consumption.

(1) DCI Message Syntax and Semantic

The DCI message syntax is defined in Table 36, semantic of syntax elements of the DCI message is provided below Table 36.

TABLE 36

| Syntax | Value | No. of bits | Format |
|---|---|---|---|
| DCI_message ( ) { | | | |
|    message_id | | 16 | uimsbf |
|    version | | 8 | uimsbf |
|    length | | 16 | uimsbf |
|    extension_fields { | | | |
|    } | | | |
|    Payload { | | | |
|       DCI_table( ) | | | |
|    } | | | |
| } | | | |

Message_id: This indicates the DCI message. A length of this field is 16 bits.

Version: This indicates a version of the DCI message. The MMT client may check whether the received message is new. Particularly, when the messages are repeatedly transmitted through a broadcasting network, this field is useful. A length of this field is 8 bits.

Length: This indicates a length of DCI message calculated in bytes from the next field of the DCI message to a last byte. "0" is not used in this field.

DCI_table( ): This provides the device capability used (or recommended) for MMT packet consumption.

(2) DCI Table Syntax and Semantic

The DCI table syntax and semantic are defined in Table 37.

Table_id: This indicates an ID of the DCI table.

Version: This indicates one version of the DCI table. A newer version overrides an older version upon receipt.

Length: This indicates a length of the DCI table calculated in bytes from the next field of the DCI table to a last byte. "0" is not used in this field.

Number_of_assets: This indicates a number of assets.

Asset_id: This provides an asset ID. This is an ID attribute of AI elements in MCI.

Mime_type: This provides a Multimedia Internet Mail Extension (MIME) medium type. When complexities from mime_type elements and codec parameters in mime_type are different from parameters defined in the following complexity, the parameters defined under the complexity has a high priority.

Codec_complexity_flag: When this flag is "1", encoded complexity is provided below.

Video_codec_complexity: This provides the complexity to be processed by a video decoder. When the complexity indicated by mime_type and codec parameters is different from actual complexity, it is recommended that this syntax element set be included.

Video_average_bitrate: This provides an average bit rate by kbit/s.

Video_maximum_bitrate: This provides a maximum bit rate by kbit/s.

Horizontal_resolution: This provides a horizontal resolution of a video in the unit of pixels.

TABLE 37

| Syntax | Value | No. of bits | Format |
|---|---|---|---|
| DCI_table( ) { | | | |
|   table_id | | 8 | uimsbf |
|   version | | 8 | uimsbf |
|   length | | 16 | uimsbf |
|   number_of_assets | N1 | | |
|   for (i=0; i<N1; i++) { | | | |
|     asset_id { | | | |
|       asset_id_length | N2 | 8 | uimsbf |
|       for (j=0; j<N2; j++) { | | | |
|         asset_id_byte | | 8 | uimsbf |
|       } | | | |
|     } | | | |
|     mime_type | | 4 * 8 | uimsbf |
|     reserved | '111 1111' | 7 | bslbf |
|     codec_complexity_flag | | 1 | bslbf |
|     if (codec_complexity_flag == 1) { | | | |
|       if (mime_type == VIDEO_MIME_TYPE) { | | | |
|         video_codec_complexity { | | | |
|           video_average_bitrate | | 16 | uimsbf |
|           video_maximum_bitrate | | 16 | uimsbf |
|           horizontal_resolution | | 16 | uimsbf |
|           vertical_resolution | | 16 | uimsbf |
|           temporal_resolution | | 8 | uimsbf |
|           video_minimum_buffer_size | | 16 | uimsbf |
|         } | | | |
|       } else if (mime_type == AUDIO_MIME_TYPE) { | | | |
|         audio_codec_complexity { | | | |
|           audio_average_bitrate | | 16 | uimsbf |
|           audio_maximum_bitrte | | 16 | uimsbf |
|           audio_minimum_buffer_size | | 16 | uimsbf |
|         } | | | |
|       } | | | |
|     } | | | |
|     if (mime_type == DOWNLOAD_MIME_TYPE) { | | | |
|       download_capability { | | | |
|         required_storage | | 32 | uimsbf |
|       } | | | |
|     } | | | |
|   } | | | |
| } | | | |

Vertical_resolution: This provides a vertical resolution of the video in the unit of pixels.

Temporal_resolution: This provides a maximum temporal resolution by frames per second.

Video_minimum_buffer_size: This provides a minimum decoder buffer size required for processing video contents in the unit of kilobytes.

Audio_codec_complexity: This indicates complexity to be processed by the audio decoder. When complexity indicated by mime_type and codec parameters is different from actual complexity, it is recommended that this element be included. This syntax element set includes audio_average_bitrate, audio_maximum_bitrate, and audio_minimum_buffer_size.

Audio_average_bitrate: This provides an average bit rate by kbit/s.

Audio_maximum_bitrate: This provides a maximum bit rate by kbit/s.

Audio_minimum_buffer_size: This provides a minimum decoder buffer size required for processing audio contents in the unit of kilobytes.

Download_capability: This provides capability used for downloading files.

Required_storage: This provides a storage device required for downloading files in the unit of kilobytes.

6. Descriptors

There are three descriptors related to the MPT. The descriptors are a CRI descriptor, an SSI descriptor, and an RSI descriptor.

The CRI descriptor is used for specifying a relation between one MPEG-2 STC and an NTP clock. The clock relation for one asset from an MPEG-2 transport stream (TS) is specified by one clock_relation_id.

CRI_descriptor is included in one CRI table.

CRI_descriptor( ) syntax is defined in Table 38, and semantic of syntax elements of CRI_descriptor( ) is provided below Table 38.

TABLE 38

| Syntax | Value | No. of bits | Format |
|---|---|---|---|
| CRI_descriptor( ) { | | | |
|     descriptor_tag | | 16 | uimsbf |
|     descriptor_length | | 16 | uimbsf |
|     clock_relation_id | | 8 | uimbsf |
|     PCR_value | | 42 | uimbsf |
|     NTP_clock_sample | | 64 | uimsbf |
| } | | | |

Descriptor_tag: This indicates a tag value representing a descriptor type.

Descriptor_length: This indicates a byte length calculated from the next byte after the last byte in this field of the descriptor.

Clock_relation_id: This indicates an identification of one clock relation.

PCR_value: This indicates one MPEG-2 PCR value corresponding to next NTP_clock_sample. The PCR value is a 42-bit type after an original format least significant bit is excluded.

NTP_clock_sample: This indicates an NTP sample value corresponding to previous PCR_value.

7. MMT_general_location_info( ) Syntax Element Set

One MMT_general_location_info( ) syntax element set is used for providing location information. MMT_general_location_info( ) syntax is defined in Table 39, and semantic of syntax elements of MMT_general_location_info( ) is provided below Table 39.

TABLE 39

| Syntax | Value | No. of bits | Format |
|---|---|---|---|
| MMT_general_location_info( ) { | | | |
|   location_type | | 8 | uimsbf |
|   if (location_type == 0x00) { | | | |
|     packet_id | | 16 | uimsbf |
|   } else if (location_type == 0x01) { | | | |
|     ipv4_src_addr | | 32 | uimsbf |
|     ipv4_dst_addr | | 32 | uimsbf |
|     dst_port | | 16 | uimsbf |
|     packet_id | | 16 | uimsbf |
|   } else if (location_type == 0x02) { | | | |
|     ipv6_src_addr | | 32 | uimsbf |
|     ipv6_dst_addr | | 32 | uimsbf |
|     dst_port | | 16 | uimsbf |
|     packet_id | | 16 | uimsbf |
|   } else if (location_type == 0x03 \|\| location_type == 0x04) { | | | |
|     network_id | | 16 | uimsbf |
|     MPEG_2_transport_stream_id | | 16 | uimsbf |
|     reserved | | 3 | bslbf |
|     MPEG_2_PID | '111' | 13 | uimsbf |
|   } else if (location_type == '0x05') { | | | |
|     URL_length | N1 | 8 | uimsbf |
|     for (i=0; i<N1; i++) { | | | |
|       URL_byte | | 8 | uimsbf |
|     } | | | |
|   } else if (location_type == '0x06') { | | | |
|     URL_length | N2 | 8 | uimsbf |
|     for (i=0; i<N2; i++) { | | | |
|       URL_byte | | 8 | uimsbf |
|     } | | | |
|     byte_offset | | 16 | uimsbf |
|     length | | 16 | uimsbf |
|   } else if (location_type == '0x07') { | | | |
|   } else if (location_type == '0x08') { | | | |
|     message_id | | 8 | uimsbf |

TABLE 39-continued

| Syntax | Value | No. of bits | Format |
|---|---|---|---|
|     } else if (location_type == '0x09') { | | | |
|         packet_id | | 16 | uimsbf |
|         message_id | | 8 | uimsbf |
|     } else if (location_type == '0x0A') { | | | |
|         ipv4_src_addr | | 32 | uimsbf |
|         ipv4_dst_addr | | 32 | uimsbf |
|         dst_port | | 16 | uimsbf |
|         packet_id | | 16 | uimsbf |
|         message_id | | 8 | uimsbf |
|     } else if (location_type == '0x0B') { | | | |
|         ipv6_src_addr | | 64 | uimsbf |
|         ipv6_dst_addr | | 64 | uimsbf |
|         dst_port | | 16 | uimsbf |
|         packet_id | | 16 | uimsbf |
|         message_id | | 8 | uimsbf |
|     } | | | |
| } | | | |

Location_type: This field indicates a type of location information as defined in Table 40.

TABLE 40

| Value | Meaning |
|---|---|
| 0x00 | A data path in the same IP/UDP flow as the one that carries the data structure to which this MMT_general_location_info( ) belongs |
| 0x01 | A data path in a UDP/IP (version 4) flow |
| 0x02 | A data path in a UDP/IP (version 6) flow |
| 0x03 | A program within an MPEG-2 TS in a broadcast network. The program is indicated by a PMT PID. |
| 0x04 | An elementary stream (ES) in an MPEG-2 TS in a broadcast network |
| 0x05 | A URL |
| 0x06 | A byte range in the file addressed by a URL |
| 0x07 | The same MMT signaling message as the one that carries the data structure to which this MMT_general_location_info( ) belongs |
| 0x08 | An MMT signaling message delivered in the same data path as the one that carries the data structure to which this MMT_general_location_info( ) belongs |
| 0x09 | An MMT signaling message delivered in a data path in the same UDP/IP flow as the one that carries the data structure to which this MMT_general_location_info( ) belongs |
| 0x0A | An MMT signaling message delivered in a data path in a UDP/IP (version 4) flow |
| 0x0B | An MMT signaling message delivered in a data path in a UDP/IP (version 6) flow |
| 0x0C~0xFF | reserved for future use |

Packet_id: This corresponds to packet_id in an MMT packet header.

Ipv4_src_addr: This indicates an Internet protocol version 4 source address of one Internet protocol application data flow.

Ipv4_dst_addr: This indicates an Internet protocol version 4 destination address of one Internet protocol application data flow.

Dst_port: This indicates a destination port number of one Internet protocol application data flow.

Ipv6_src_addr: This indicates an Internet protocol version 6 source address of one Internet protocol application data flow.

Ipv6_dst_addr: This indicates an Internet protocol version 6 destination address of one Internet protocol application data flow.

Network_id: This indicates a broadcast network identification having the MPEG_2_TS.

MPEG-2_trasnport_stream_id: This indicates an MPEG-2 transport stream identification.

MPEG-2_PID: This indicates a packet identification of an MPEG-2 transport stream packet (PID).

URL_length: This indicates a byte length of one webpage address. The termination null(0x00) is not calculated.

URL_byte: This indicates one byte in one webpage address. The termination null (0x00) is not calculated.

Byte_offset: This indicates one byte offset from a first byte of one file.

Length: This indicates a byte length.

Message_id: This indicates an MMT signaling message identification.

8. Message Identifications, Table Identifications, and Descriptor Tags.

Values of the message identification (message_id) are allocated in Table 41.

TABLE 41

| Value | Description |
|---|---|
| 0x0000~0x00FF | Reserved |
| 0x0100~0x04FF | LOT messages |
| 0x0500~0x44FF | MCI messages. For a package, 16 contiguous values are allocated to MCI messages. If the value % 16 equals 15, the MCI message carries complete CI. If the value % 16 equals N where N = 0~14, the MCI message carries Layer-N CI. |
| 0x2500~0x84FF | MPT messages. For a package, 16 contiguous values are allocated to MPT messages. If the value % 16 equals 15, the MPT message carries complete MPT. If the value % 16 equals N where N = 0~14, the MPT message carries Layer-N MPT. |
| 0x4500~0x88FF | CRI messages |
| 0x4900~0x8CFF | DCI messages |
| 0x8D00~0xFFFF | Reserved for future use |

Values of the table identification (table_id) are allocated in Table 42.

TABLE 42

| Value | Description |
|---|---|
| 0x00~0x0F | Reserved |
| 0x10 | LOT table |
| 0x11~0x1F | Layer-0 MCI table~Layer-15 MCI table |
| 0x20 | Complete MCI table |
| 0x21~0x30 | Reserved |
| 0x31~0x3F | Layer-0 MPT~Layer-15 MPT |

TABLE 42-continued

| Value | Description |
| --- | --- |
| 0x40 | Complete MPT |
| 0x41~0x50 | Reserved |
| 0x51 | CRI table |
| 0x52 | DCI table |
| 0x53~0xFF | Reserved for future use |

Values of the descriptor tag are allocated in Table 43.

TABLE 43

| Value | Description |
| --- | --- |
| 0x0000~0x000F | Reserved |
| 0x0010 | CRI descriptor |
| 0x0011~0xFFFF | Reserved for future use |

The third embodiments and the fourth embodiment of the present disclosure have only different names of messages, but functional semantic thereof is similar to each other.

Further, although not illustrated, data can be recorded, stored, and reproduced according to the package generated by embodiments of the present disclosure. An MMT asset, configuration information, composition information, transport characteristics, package identification information, asset list information, rights management information, and transport timeline information within one package are stored in a storage medium (for example, a DC, a DVD, a BD, a USB or the like), and contents can be reproduced by analyzing package elements in the reproduction. When the contents are stored and reproduced through the storage medium, the storage and reproduction can be more easily made by substituting storage location information (for example, a memory address or the like) for a URL in the description of the embodiment.

The aforementioned embodiments are understood as examples of the present disclosure. It may be understood that all features described in associated with one of the aforementioned embodiments may be used alone, combined with other described features, combined with one or more features of another embodiment of the aforementioned embodiments, or combined with different embodiments of the aforementioned embodiments.

While the present disclosure has been shown and described with reference to various embodiments thereof, it will be understood by those skilled in the art that various changes in forms and detailed may be made therein without departing from the spirit and scope of the present disclosure as defined by the appended claims and their equivalent.

What is claimed is:

1. A method for receiving a packet, the method comprising:
    receiving the packet including a header and a payload, the payload including a control message related to a package configuration of multimedia contents; and
    decoding the packet,
    wherein the control message comprises:
        a control message payload including at least one table including information related to the multimedia contents,
        type information of the control message,
        information related to a length of the control message,
        information related to a version of the control message, and
        extension information including configuration information related to the at least one table included in the control message payload.

2. The method of claim 1, wherein if the at least one table is divided into a table subset, the at least one table includes mode information for processing the table subset.

3. The method of claim 2, wherein the mode information for processing the table subset indicates that a table subset process is in a sequential order.

4. The method of claim 2, wherein the mode information for processing the table subset indicates that a table subset process is based on a version.

5. The method of claim 1, wherein the at least one table includes a table identifier for identifying whether the at least one table is complete or includes a table subset.

6. An apparatus for receiving a packet, the apparatus comprising:
    a controller configured to receive the packet including a header and a payload, the payload including a control message related to a package configuration of multimedia contents; and
    a decoder configured to decode the packet,
    wherein the control message comprises:
        a control message payload including at least one table including information related to the multimedia contents,
        type information of the control message,
        information related to a length of the control message,
        information related to a version of the control message, and
        extension information including configuration information related to the at least one table included in the control message payload.

7. The apparatus of claim 6, wherein if the at least one table is divided into a table subset, the at least one table includes mode information for processing the table subset.

8. The apparatus of claim 7, wherein the mode information for processing the table subset indicates that a table subset process is in a sequential order.

9. The apparatus of claim 7, wherein the mode information for processing the table subset indicates that a table subset process is based on a version.

10. The apparatus of claim 6, wherein the at least one table includes a table identifier for identifying whether the at least one table is complete or includes a table subset.

11. An apparatus for providing multimedia contents, the apparatus comprising:
    a processor configured to identify a control message related to a package configuration of the multimedia contents, the control message being included in a payload of a packet; and
    a transmitter configured to transmit the packet including a header and the payload,
    wherein the control message comprises:
        a control message payload including at least one table including information related to the multimedia contents,
        type information of the control message,
        information related to a length of the control message,
        information related to a version of the control message, and
        extension information including configuration information related to the at least one table included in the control message payload.

12. The apparatus of claim 11, wherein if the at least one table is divided into a table subset, the at least one table includes mode information for processing the table subset.

13. The apparatus of claim 12, wherein the mode information for processing the table subset indicates that a table subset process is in a sequential order.

14. The apparatus of claim 12, wherein the mode information for processing the table subset indicates that a table subset process is based on a version.

15. The apparatus of claim 11, wherein the at least one table includes a table identifier for identifying whether the at least one table is complete or includes a table subset.

* * * * *